United States Patent
Matsuyama et al.

(10) Patent No.: US 11,029,674 B2
(45) Date of Patent: Jun. 8, 2021

(54) INFORMATION PROCESSING DEVICE AND INFORMATION PROCESSING METHOD

(71) Applicant: OMRON Corporation, Kyoto (JP)

(72) Inventors: Takayoshi Matsuyama, Kusatsu (JP); Reiko Hattori, Kyoto (JP); Toru Fujii, Kyoto (JP); Hideki Yachiku, Osaka (JP); Hiroshi Kuribayashi, Otsu (JP)

(73) Assignee: OMRON Corporation, Kyoto (JP)

( * ) Notice: Subject to any disclaimer, the term of this patent is extended or adjusted under 35 U.S.C. 154(b) by 321 days.

(21) Appl. No.: 16/005,688

(22) Filed: Jun. 12, 2018

(65) Prior Publication Data

US 2019/0072945 A1   Mar. 7, 2019

(30) Foreign Application Priority Data

Sep. 5, 2017 (JP) .............................. JP2017-170490

(51) Int. Cl.
*G05B 23/02* (2006.01)
*G06Q 10/00* (2012.01)
*G06N 20/00* (2019.01)

(52) U.S. Cl.
CPC ......... *G05B 23/0208* (2013.01); *G06N 20/00* (2019.01); *G06Q 10/00* (2013.01)

(58) Field of Classification Search
CPC ..... G05B 23/0208; G06N 20/00; G06Q 10/00
See application file for complete search history.

(56) References Cited

U.S. PATENT DOCUMENTS

| | | | | |
|---|---|---|---|---|
| 8,423,168 B2* | 4/2013 | Nonaka | ............. | G05B 19/4184 700/99 |
| 8,768,499 B2* | 7/2014 | Attila | ............... | G05B 19/41885 700/108 |
| 2008/0103715 A1 | 5/2008 | Tsuda et al. | | |
| 2016/0342392 A1 | 11/2016 | Tasaki | | |

FOREIGN PATENT DOCUMENTS

| | | |
|---|---|---|
| JP | H1148090 | 2/1999 |
| JP | 2007034720 | 2/2007 |
| JP | 2008112209 | 5/2008 |
| JP | 2009180722 | 8/2009 |
| JP | 2010139248 | 6/2010 |
| JP | 2011070635 | 4/2011 |
| JP | 2013012100 | 1/2013 |
| JP | 2015049606 | 3/2015 |
| JP | 2015152933 | 8/2015 |
| WO | 2013030984 | 3/2013 |

OTHER PUBLICATIONS

"Search Report of Europe Counterpart Application", dated Sep. 20, 2018, p. 1-p. 7.
Office Action of Japan Counterpart Application, with English translation thereof, dated Mar. 16, 2021, pp. 1-10.

* cited by examiner

*Primary Examiner* — Elias Desta

(74) *Attorney, Agent, or Firm* — JCIPRNET

(57) ABSTRACT

An information processing device determines, based on a preset threshold, whether the production index belongs to either a first section or a second section contained in one maintenance cycle of the member, wherein a change in the production index is larger in the second section than in the first section. The information processing device executes at least one of first processing in which the production index determined to belong to the first section is used and second processing in which the production index determined to belong to the second section is used.

17 Claims, 32 Drawing Sheets

INFORMATION PROCESSING DEVICE AND INFORMATION PROCESSING METHOD

CROSS-REFERENCE TO RELATED APPLICATION

This application claims the priority benefit of Japan Patent Application No. 2017-170490, filed on Sep. 5, 2017. The entirety of the above-mentioned patent application is hereby incorporated by reference herein and made a part of this specification.

BACKGROUND

Technical Field

The disclosure relates to an information processing device and an information processing method.

Related Art

Conventionally, there is known a device and a method that manage a state of a facility.

For example, WO 2013/030984 discloses, as such a method, a method of monitoring a state of a facility on the basis of a time-series signal output from the facility. In this method, (i) an operation pattern label is assigned for each fixed interval on the basis of the time-series signal; (ii) learning data is selected on the basis of the operation pattern label for each fixed interval; (iii) a normal model is created on the basis of the selected learning data; (iv) an anomaly measure is calculated on the basis of the time-series signal and the normal model; and (v) whether the state of the facility is anomaly or normal is discriminated on the basis of the calculated anomaly measure (see the [Abstract]).

Japanese Laid-open No. 2011-070635 discloses a facility state monitoring method that detects an anomaly on the basis of a time-series sensor signal output from a facility or a device. In this method, (i) modes are divided for each operating state based on event signals output from the facility; (ii) a normal model is created for each mode; (iii) sufficiency of learning data for each mode is checked; and (iv) anomaly identification is performed using a threshold set according to a result of the check (see the [Abstract]).

Japanese Laid-open No. 2010-139248 discloses a method of determining service life of a target facility. This methods includes: (i) step 1 in which a number of times of repetition of fluctuating stress of a bearing portion is estimated on the basis of a time change in electric power or current of an electric motor of the target facility, and a life consumption rate is obtained to determine remaining life; (ii) step 2 in which, according to a power law of a time rate of change of a vibration measure obtained from a vibration sensor attached to the bearing portion, progress of the degradation state is tracked, and a time point of arrival at a dangerous region is estimated; and (iii) step 3 in which, as a result of the vibration diagnosis in step 2, in the late stage of an attention area, the remaining life is determined according to step 1 and step 2. Furthermore, in step 3 of this method, the service life of the target facility is determined from two remaining life periods of step 1 and step 2 (see the [Abstract]).

Japanese Laid-open No. 2009-180722 discloses a support method of determination of an optimum maintenance time of a target facility, and so on. This method includes: (i) a simple diagnosis step in which mechanical soundness at a certain time point is diagnosed; (ii) a precision diagnosis step in which type and degree of mechanical degradation are inferred; (iii) a trend monitoring step in which progress of the degradation state is tracked; (iv) a life prediction step in which a reaching timing of the malfunction at a dangerous region is predicted from a degradation pattern in the trend monitoring step; (v) an energy loss evaluation step in which energy loss of the target facility is estimated from progress of the degree of degradation in the trend monitoring step; and (vi) an energy load evaluation step required when restoring a degraded component or a degraded device. Furthermore, in this method, an energy loss evaluation result and an energy load evaluation result are added together to perform optimization of a timing for restoring the degradation state (see the [Abstract]).

Manufacturing conditions of a product in a production device change every moment depending on degree of degradation of consumables or the like, and degree of degradation of device elements (e.g., components, jigs and so on) whose state gradually changes over a long term. In addition, according to a change in manufacturing conditions, a production index showing quality of the product also changes.

SUMMARY

According to an example of the disclosure, an information processing device includes: a calculation part, calculating a production index based on quality of a product based on data acquired from a production device that produces the product using a member of at least one of a material and a component; a determination part, determining, based on a preset threshold, whether the production index belongs to either a first section or a second section contained in one maintenance cycle of the member, wherein a change in the production index is larger in the second section than in the first section; and an execution part, executing at least one of first processing in which the production index determined to belong to the first section is used and second processing in which the production index determined to belong to the second section is used.

According to another example of the disclosure, an information processing method includes: calculating a production index based on quality of a product based on data acquired from a production device that produces the product using a member of at least one of a material and a component; determining, based on a preset threshold, whether the production index belongs to either a first section or a second section contained in one maintenance cycle of the member, wherein a change in the production index is larger in the second section than in the first section; and executing at least one of first processing in which the production index determined to belong to the first section is used and second processing in which the production index determined to belong to the second section is used.

DESCRIPTION OF THE EMBODIMENTS

Figure 1:
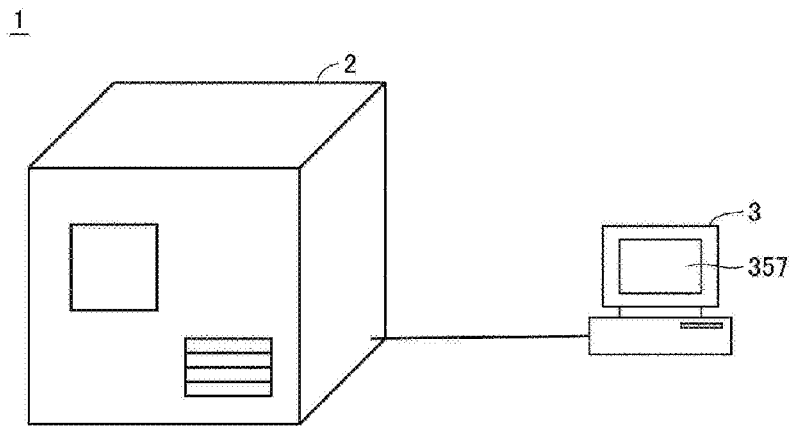
FIG. 1 is a system configuration diagram according to the present example.

The disclosure provides an information processing device and an information processing method capable of executing processing according to a mode of a change in manufacturing conditions by utilizing a production index.

According to the above configuration, it becomes possible to execute processing according to a mode of a change in manufacturing conditions by utilizing the production index.

The execution part includes a prediction part predicting a remaining production quantity that can be produced by the member based on an allowable value relating to the production index as the second processing.

According to the above configuration, based on the production index belonging to the second section, the remaining production quantity that can be produced by the member can be predicted.

The production device produces the product using the member and a plurality of device elements each constituting the production device and being different in type. A maintenance cycle of each of the device elements is longer than the maintenance cycle of the member. The execution part includes an inference part inferring from among the device elements a device element that causes the production index to deteriorate as the first processing.

According to the above configuration, based on the production index belonging to the first section, the device element that causes the production index to deteriorate can be inferred.

The production device has, as the device elements, a plurality of first device elements and a plurality of second device elements different from the first device elements in number and type. The inference part infers from among the first device elements and the second device elements a device element that causes the production index to deteriorate, based on periodicity of deterioration of the production index belonging to the first section that relates to cumulative production quantity of the product.

According to the above configuration, based on the production index belonging to the first section, the device element that causes the production index to deteriorate can be inferred.

The production device has a plurality of first device elements as device elements of a first type among the device elements. The product is produced using, among the first device elements, one first device element designated for each product. The production index is associated with first identification information for identifying, among the first device elements, the first device element used for production of the product. The inference part infers from among the first device elements, the first device element that was used for production of the product when the production index has deteriorated, based on the production index belonging to the first section and the first identification information associated with the production index.

According to the above configuration, based on the production index belonging to the first section and the identification information associated with the production index for identifying the first device element, the device element that causes the production index to deteriorate can be inferred.

The production device further has a plurality of second device elements as device elements of a second type among the device elements. The product is produced using, among the second device elements, one second device element designated for each product. The production index is associated with second identification information for identifying, among the second device elements, the second device element used for production of the product. The inference part infers from among the first device elements and the second device elements a device element that causes the production index to deteriorate, based on the production index belonging to the first section as well as the first identification information and the second identification information associated with the production index.

According to the above configuration, based on the production index belonging to the first section, the identification information associated with the production index for identifying the first device element and the identification information associated with the production index for identifying the second device element, the device element that causes the production index to deteriorate can be inferred.

The information processing device further includes: a generation part, generating model data showing a relationship between the cumulative production quantity of the product and the production index; and a setting part, setting the threshold based on the model data.

According to the above configuration, since the threshold is set based on the model data based on the production index, whether the production index after the threshold is set belongs to either a slow section or a steep section can be determined.

The generation part generates the model data based on the production index obtained in a plurality of the maintenance cycles of the member.

According to the above configuration, it is possible to create highly accurate model data rather than creating model data based on the production index obtained in one maintenance cycle.

The first section and the second section are continuous.

According to the above configuration, since the execution part utilizes all the production indices belonging to one maintenance circle, the calculated production indices can be efficiently utilized.

The first section and the second section are separated.

According to the above configuration, as compared to a case where the first section and the second section are not separated (a case where no section is set between the first section and the second section), it becomes possible to increase accuracy of a predicted value of available production quantity and it also becomes possible to perform the factor inference with high precision.

The first section and the second section partially overlap.

According to the above configuration, by providing an overlap section, data quantity of the production indices in the first section and the second section can be increased.

The setting part sets the threshold based on the allowable value relating to the production index.

According to the above configuration, the threshold can be easily set.

The setting part calculates a mathematical expression representing a curve based on the model data in a two-dimensional coordinate system using each of the cumulative production quantity and the production index as a coordinate axis. The setting part calculates a coordinate value of the coordinate axis of the production index at the time when a curvature of the curve has become the largest. The setting part sets the calculated coordinate value as the threshold.

According to the above configuration, the threshold can be set based on the model data.

The setting part calculates a mathematical expression representing a curve based on the model data in a two-dimensional coordinate system using each of the cumulative production quantity and the production index as a coordinate axis, and sets the threshold based on an inclination of a tangent line of the curve.

According to the above configuration, the threshold can be set based on the model data.

According to the above method, it becomes possible to execute processing according to a mode of a change in manufacturing conditions by utilizing the production index.

According to the disclosure, it becomes possible to execute processing according to a mode of a change in manufacturing conditions by utilizing the production index.

In the following, embodiments of the disclosure are explained with reference to the drawings. In the following explanation, the same components are denoted by the same reference numerals, and they also have the same names and functions. Accordingly, detailed explanation thereof will not be repeated.

§ 1 Application Examples

Figure 2:
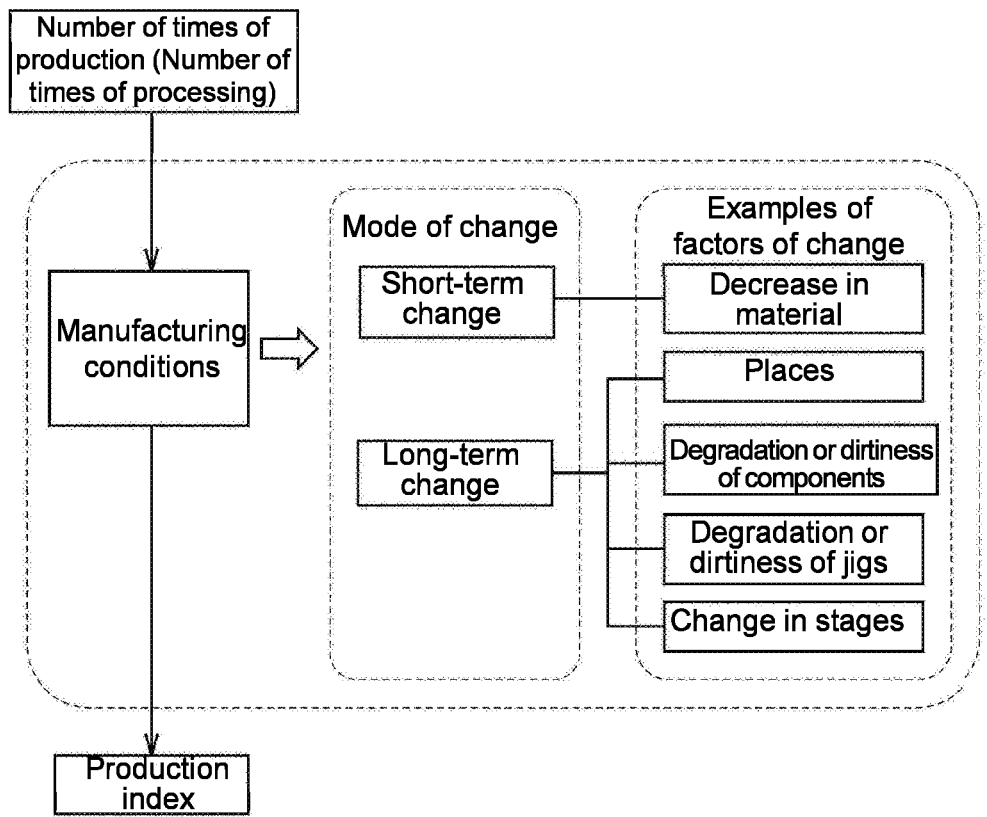
FIG. 2 is a diagram for explaining factors of change in manufacturing conditions.
Figure 3:
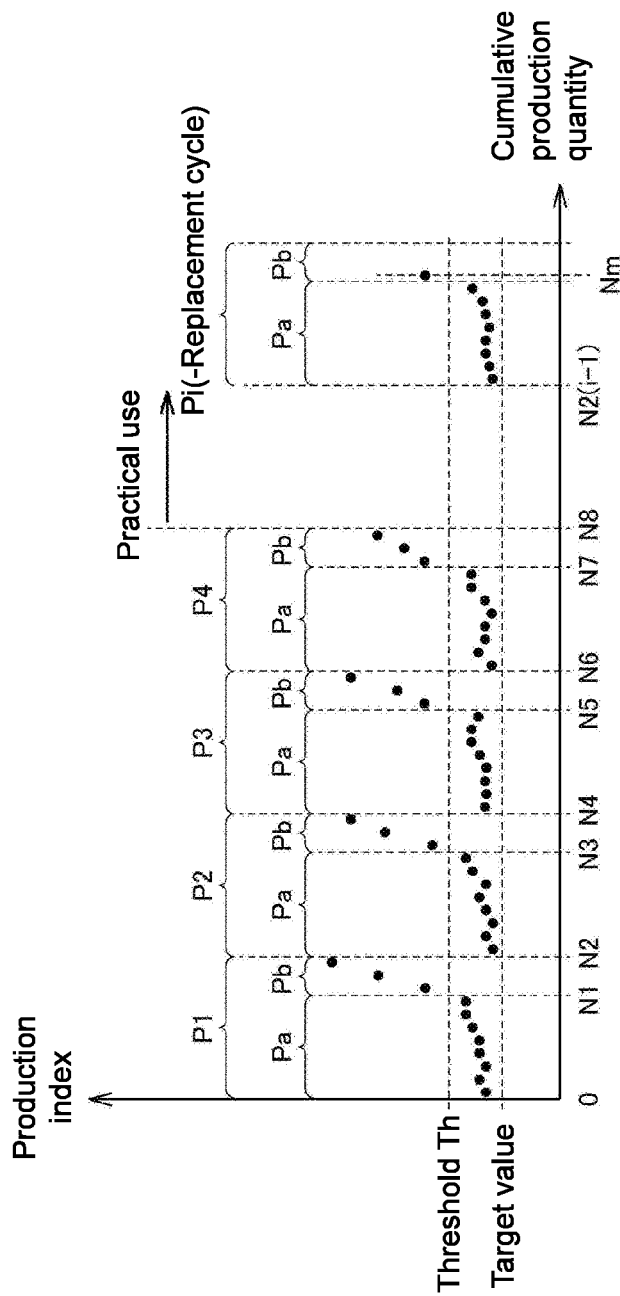
FIG. 3 is a diagram showing a relationship between cumulative production quantity of a product and production index.

First of all, an example of a situation in which the disclosure is applied is explained based on FIG. 1 to FIG. 3.

FIG. 1 is a system configuration diagram according to the present example.

Referring to FIG. 1, a system 1 includes a production device (production facility, manufacturing device) 2 and an information processing device 3. The information processing device 3 is connected to the production device 2 so as to communicate therewith.

In the production device 2, a predetermined product is repeatedly produced using a member of at least one of a material and a component. Consumables may be mentioned as an example of the member. Herein, the "consumables" include, for example, materials that decrease as the product is produced, and components that are highly frequently replaced since they wear relatively fast. In the case where the production device 2 is, for example, a semiconductor manufacturing device, a sputtering target may be mentioned as an example of the consumables. In addition, the above member also includes, in addition to the consumables, components that require highly frequent cleaning since they are relatively likely to become dirty.

The information processing device 3 acquires various data measured in the production device 2 in order to calculate a production index based on quality of the product produced by the production device 2.

FIG. 2 is a diagram for explaining factors of change in manufacturing conditions.

Referring to FIG. 2, number of times of production (number of times of processing) and production index are measurable (observable). However, manufacturing conditions cannot be observed.

A mode of change in the manufacturing conditions is periodic. The mode of change can be classified into short-term change and long-term change. A decrease in material may be mentioned as a factor that causes a short-term change (a factor that causes the production index to decrease in a relatively short cycle). In addition, degradation of a highly frequently replaced component, dirtiness of a component requiring highly frequent cleaning and so on may also be mentioned as the factors that cause the short-term change.

In contrast, a production place within a production device, degradation or dirtiness of components, degradation or dirtiness of jigs, change in stages included in the production device and so on may be mentioned as factors that cause a long-term change (factors that cause the production index to decrease in a relatively long cycle). In this manner, the factors that cause the long-term change are related to degradation of elements (hereinafter referred to as "device configuration") that constitute the production device 2 and so on. In addition, a maintenance cycle of this device configuration is longer than a maintenance cycle of the above member.

In addition, the above-mentioned production index changes depending on the manufacturing conditions. Hence, a change in the production index is a combination of a short-term change and a long-term change.

Moreover, in the following, consumables are explained as an example of the above member for convenience of explanation. In addition, a "replacement cycle" of the consumables is explained as an example of the "maintenance cycle" of the member.

FIG. 3 is a diagram showing a relationship between cumulative production quantity of the product and production index.

Referring to FIG. 3, replacement cycles P1, P2, P3, P4 and Pi (i is a natural number greater than or equal to 5) of the consumables include a slow section Pa in which a change in the production index is gradual, and a steep section Pb in which a change in the production index is steep. The reason why a production index as shown in the steep section Pb is obtained is that the manufacturing conditions suddenly deteriorate due to degradation of the consumables or the like. By replacement of the consumables by a user of the system 1, as shown by the slow section Pa after the steep section Pb, the production index is improved.

The slow section Pa and the steep section Pb are classified based on a magnitude correlation between a preset threshold Th and each production index. Typically, the threshold Th is determined prior to practical use by the information processing device 3, using the production indices (time-series data) in the replacement cycles P1, P2, P3 and P4. Moreover, the threshold Th may also be properly determined by the user instead of by the information processing device 3.

When the threshold Th is set in the information processing device 3, practical use of the production device 2 starts. The information processing device 3 sequentially calculates the production indices based on measurement data (time-series data) acquired from the production device 2. FIG. 3 also shows a state in which the production index at the time when the cumulative production quantity has become Nm is calculated.

The production index at the time when the cumulative production quantity has become Nm exceeds the threshold Th. Hence, the information processing device 3 can determine that the production index is data of the steep section Pb. In addition, in the case where the cumulative production quantity is between N2(i−1) and Nm and the production index is less than the threshold Th, the information processing device 3 can determine that the production index is data belonging to the slow section Pa.

In this manner, based on the preset threshold Th, the information processing device 3 determines whether the calculated production index belongs to either the slow section Pa or the steep section Pb contained in one replacement cycle Pi of the consumables, wherein a change in the production index is larger in the steep section Pb than in the slow section Pa. According to this, whether the calculated production indices are data of the slow section Pa or data of the steep section Pb can be determined.

Furthermore, the information processing device 3 executes at least one of processing (hereinafter also referred to as "processing Qa") using the production index determined to belong to the slow section Pa and processing (hereinafter also referred to as "processing Qb") using the production index determined to belong to the steep section Pb.

In addition, as mentioned above, the production index changes according to a change in the manufacturing conditions of the product. Accordingly, according to the information processing device 3, it becomes possible to execute processing according to a mode of a change in the manufacturing conditions by utilizing the production index.

Based on the production index determined to belong to the slow section Pa, the information processing device 3 infers from among a plurality of device elements (components, jigs, stages and so on) a device element that causes the production index to deteriorate, as an example of the above processing Qa.

Based on the production index determined to belong to the steep section Pb and an allowable value relating to the production index, the information processing device 3 predicts a remaining production quantity that can be produced by the current consumables, as an example of the above processing Qb. That is, the information processing device 3 infers from the obtained device elements a device element that causes the production index to deteriorate, by using the production indices other than the production index of the steep section Pb which is greatly affected by the consumables.

§ 2 Configuration Examples

[A. Flow of Processing]
(1) Outline

Figure 4:
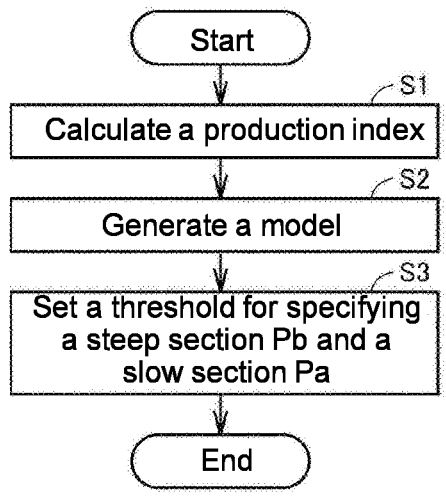
FIG. 4 is a flowchart showing a flow of processing in an information processing device prior to practical use.

FIG. 4 is a flowchart showing a flow of processing in the information processing device 3 prior to practical use.

Referring to FIG. 4, in step S1, the information processing device 3 calculates a production index based on various measurement data obtained by measurements performed by a sensor or the like included in the production device 2. As the "production index," yield rate, defect rate, output, ratio of successfully processed products in each unit process, and ratio of unsuccessfully processed products in each unit process, for example, may be mentioned. Which index among such production indices is to be used is properly determined in advance by a manufacturer or a user of the production device 2 based on the product produced by the production device 2.

Figure 7:
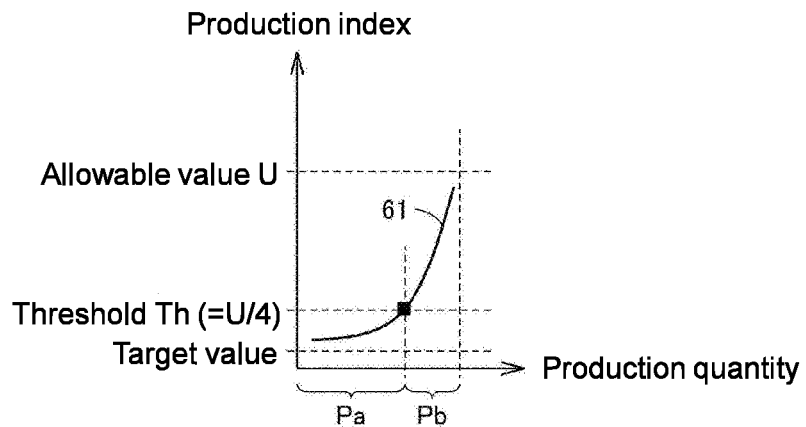
FIG. 7 is a diagram for explaining a case where a user or a manufacturer or the like sets a threshold based on an allowable value.
Figure 8:
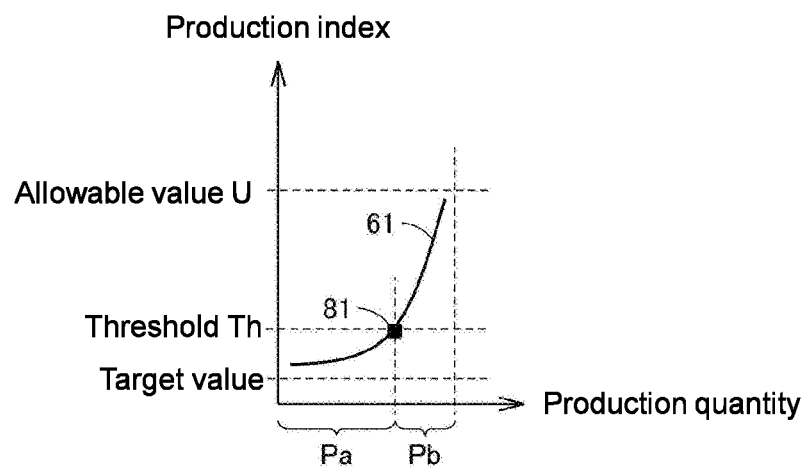
FIG. 8 is a diagram for explaining a case where the information processing device automatically calculates a value of the threshold using a model curve.
Figure 9:
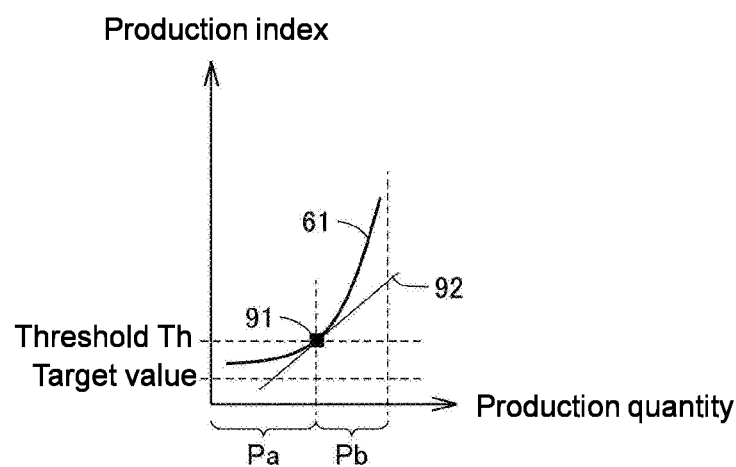
FIG. 9 is a diagram for explaining a case where the information processing device automatically calculates the value of the threshold using the model curve.

In step S2, the information processing device 3 generates a model based on the calculated production index. Specific examples of the model will be described later (graph (a) to graph (c) of FIG. 6). In step S3, the information processing device 3 sets the threshold Th for specifying the slow section Pa and the steep section Pb. Details of the setting of the threshold Th will also be described later (FIG. 7 to FIG. 9 and so on).

In addition, the production index may be associated with identification information (hereinafter also referred to as "ID") of a device element used for production of the product. The information processing device 3 associates the production index with different identification information according to which device element, place, device and so on the measurement data is related to. Since one product is generated using a plurality of device elements, each production index is typically associated with identification information of a plurality of device elements. For example, one production index is associated with ID relating to places, ID relating to components, ID relating to jigs, and ID relating to stages.

Figure 5:
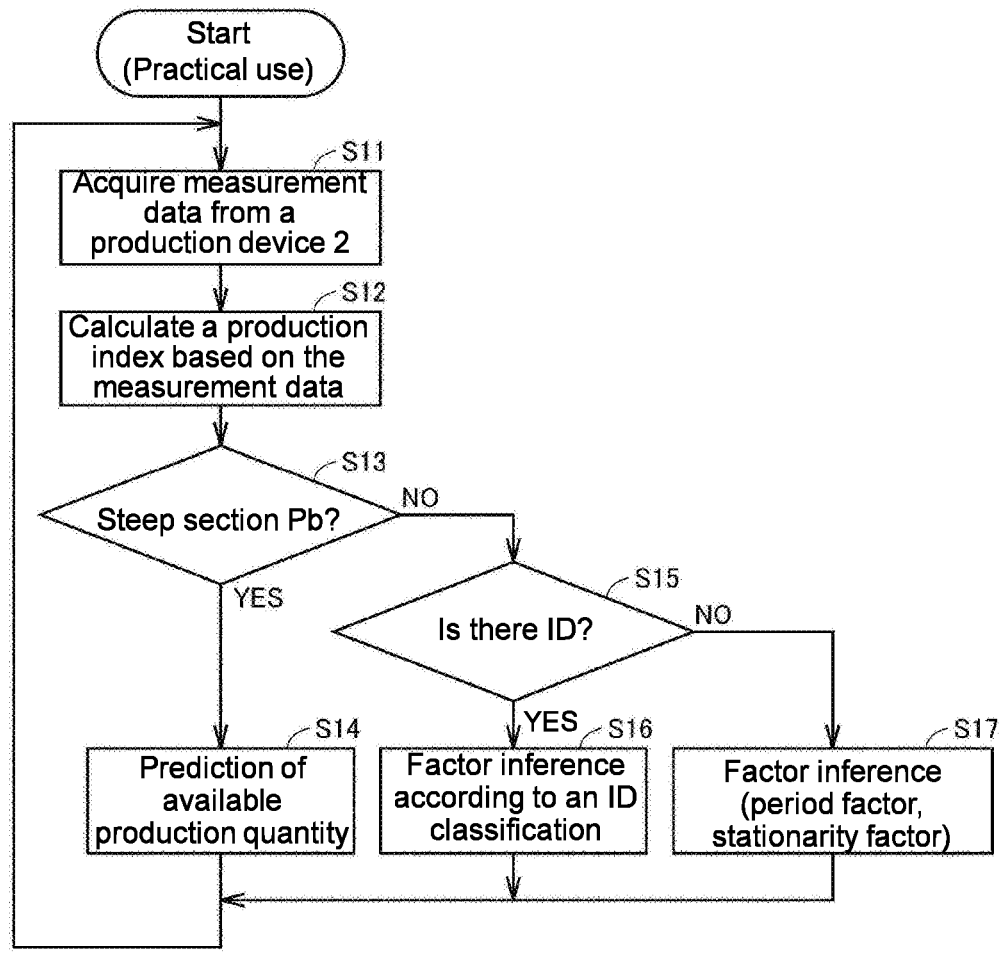
FIG. 5 is a flowchart showing a flow of processing in the information processing device during practical use.

FIG. 5 is a flowchart showing a flow of processing in the information processing device 3 during practical use.

Referring to FIG. 5, in step S11, the information processing device 3 acquires measurement data from the production device 2. In step S12, the information processing device 3 calculates a production index based on the measurement data.

In step S13, the information processing device 3 determines whether or not the calculated production index is data belonging to the steep section Pb by using the threshold Th. When the calculated production index is determined to belong to the steep section Pb (YES in step S13), in step S14, the information processing device 3 predicts how many products can be produced in the remaining process using the currently used consumables (current consumables). In the following, the quantity that can be produced is also referred to as "available production quantity."

When the calculated production index is determined to not belong to the steep section Pb (NO in step S13), in step S15, the information processing device 3 determines whether or not the production index is associated with identification information (ID) of a device element used for production of the product.

When it is determined that there is association with ID (YES in step S15), in step S16, the information processing device 3 executes a factor inference according to an ID classification. When it is determined that there is no association with ID (NO in step S15), in step S17, the information processing device 3 executes a factor inference taking periodicity or the like into consideration. Specific examples of the factor inference will be described later.

(2) Model Creation

Figure 6:
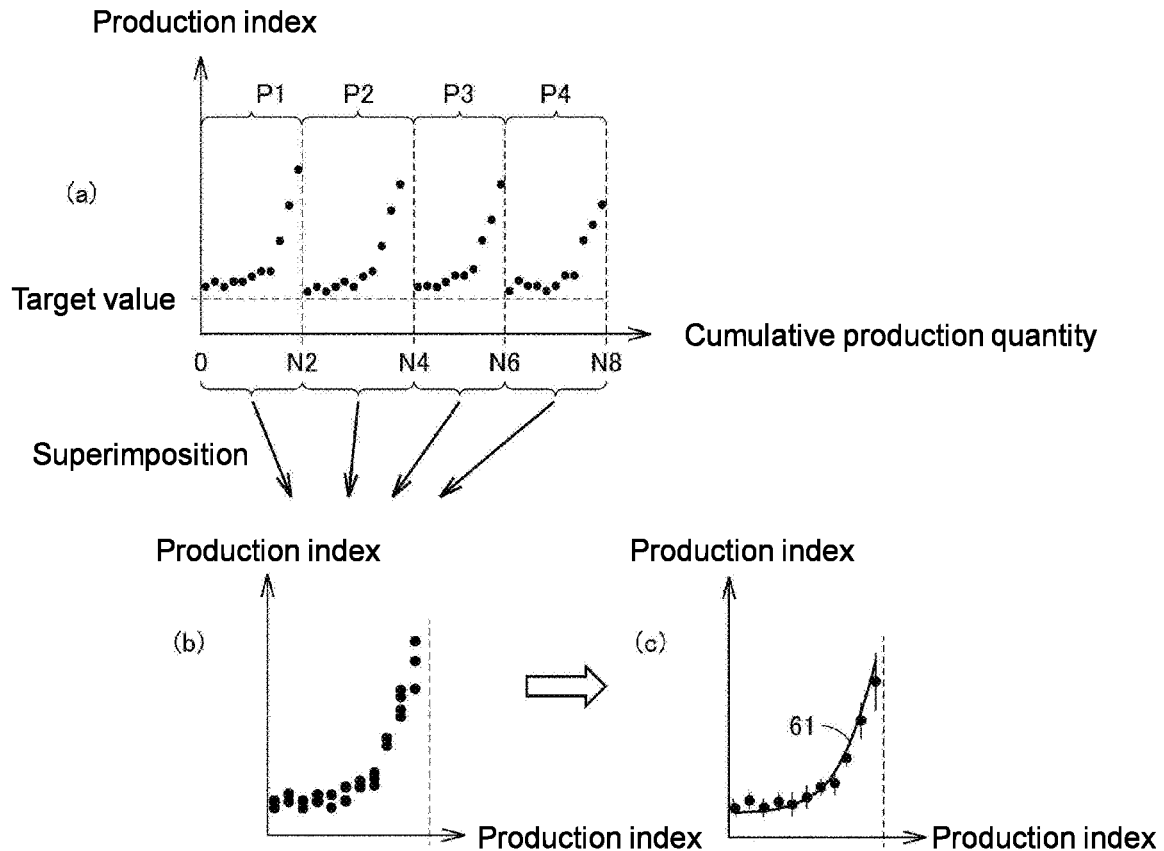
FIG. 6 has graph (a) to graph (c) for explaining an example of creation of a model.

Graph (a) to graph (c) of FIG. 6 are diagrams for explaining an example of creation of a model. The model is used for calculating the threshold Th.

Referring to graph (a) to graph (c) of FIG. 6, as an example, the information processing device 3 generates a model using production indices contained in the four replacement cycles P1 to P4 (see FIG. 3) with the cumulative production quantity ranging from 0 to N8, as shown in graph (a). Moreover, a replacement cycle (one period) is expressed as the cumulative production quantity during a period from when the user last replaced the consumables until the present replacement of the consumables.

The information processing device 3 superimposes the production indices contained in the four replacement cycles P1 to P4, as shown in graph (b). The information processing device 3 performs the superimposition so that the data at the beginning of the production index of the replacement cycle P1, the data at the beginning of the production index of the replacement cycle P2, the data at the beginning of the production index of the replacement cycle P3 and the data at the beginning of the production index of the replacement cycle P4 match in values on the horizontal axis (production quantity). Intervals between the production indices on the horizontal axis are the same in the four replacement cycles P1 to P4.

The information processing device 3 generates the model showing a relationship between production quantity and production index based on the data of the superimposed production indices. In graph (c), the model is expressed as a curve 61. As an example, the information processing device 3 creates the curve 61 using average values of the four production indices having the same values on the horizontal axis. The curve 61 may be generated using, for example, the least squares method.

As stated above, the information processing device 3 creates a model (curve 61) showing an average change in the production index in a plurality of replacement cycles. Moreover, the disclosure is not limited to the above, and the information processing device 3 may generate a model showing a change in the maximum value of the production index in a plurality of replacement cycles. In addition, the information processing device 3 may generate a model based on the production index in one replacement cycle. Moreover, in the following, the curve 61 is also referred to as "model curve 61."

(3) Setting of Threshold

Methods of setting the threshold Th are roughly classified into two methods. One method is that the user or the manufacturer or the like determines the threshold Th based on an allowable value. The other method is that the information processing device 3 automatically calculates a value of the threshold Th using the model curve 61.

These methods are explained in the following.

FIG. 7 is a diagram for explaining the case where the user or the manufacturer (hereinafter also referred to as "user or the like") sets the threshold Th based on an allowable value. The "allowable value" is a value of a production index established as a product.

Referring to FIG. 7, the user or the like sets a value obtained by multiplying an allowable value U of the production index by a predetermined ratio as the threshold Th. In the example of FIG. 7, a value (U/4) obtained by multiplying the allowable value U by ¼ is set as the threshold Th. The user or the like may determine the predetermined ratio by referring to the model curve 61 or may determine the predetermined ratio without referring to the model curve 61.

FIG. 8 is a diagram for explaining the case where the information processing device 3 automatically calculates the value of the threshold Th using the model curve 61.

Referring to FIG. 8, the information processing device 3 calculates a point 81 at which a curvature in the model curve 61 becomes the largest. In detail, the information processing device 3 calculates a value of the production quantity (value on the horizontal axis) at which the curvature in the model curve 61 becomes the largest. The information processing device 3 sets, as the threshold Th, a value of the production index (value on the vertical axis) corresponding to the calculated value (value on the horizontal axis) in the model curve 61.

Similarly to FIG. 8, FIG. 9 is a diagram for explaining the case where the information processing device 3 automatically calculates the value of the threshold Th using the model curve 61.

Referring to FIG. 9, when the production quantity is increased, a boundary point 91 at which a rate of change in the model curve 61 (inclination of a tangent line of the curve 61) exceeds a fixed value for the first time is calculated. In detail, as an example, the information processing device 3 calculates the boundary point 91 at which the rate of change becomes 0.2 or greater. Moreover, a straight line 92 represents a straight line whose inclination (rate of change) is 0.2.

(4) Processing in Steep Section

Figure 10:
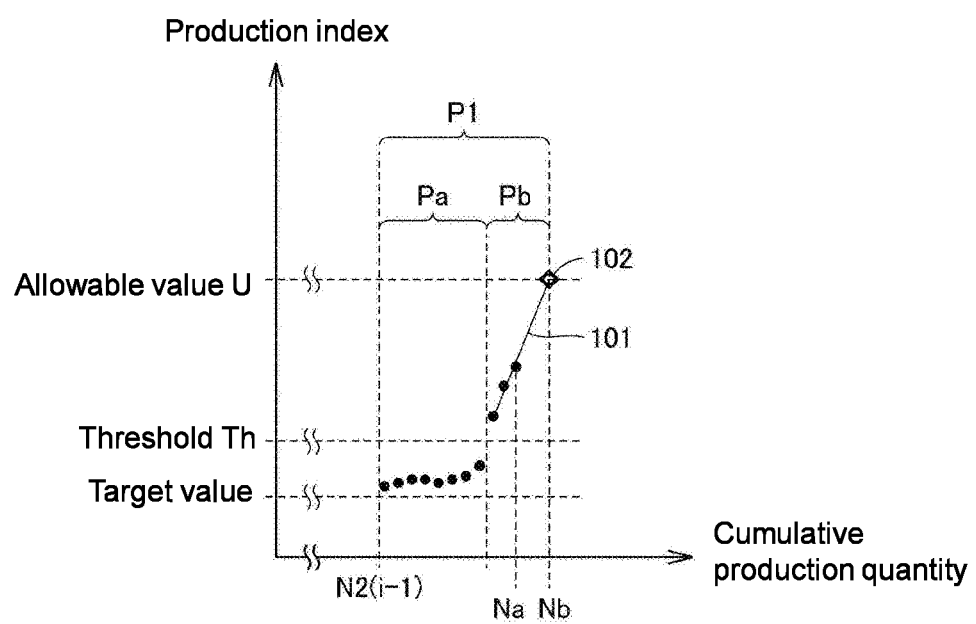
FIG. 10 is a diagram for explaining processing using a production index determined to belong to a steep section.

FIG. 10 is a diagram for explaining processing using a production index determined to belong to the steep section Pb. In detail, FIG. 10 is a diagram for explaining the processing in step S14 in FIG. 5.

Referring to FIG. 10, the information processing device 3 calculates available production quantity (Nb−Na) based on the production index belonging to the steep section Pb and the allowable value U. A calculation method is specifically explained as follows using the example of FIG. 10.

First of all, the information processing device 3 performs linear approximation on points (plotted data) representing the values of three production indices belonging to the steep section Pb. The information processing device 3 calculates a value (Nb) of the cumulative production quantity at which a value of a straight line 101 (obtained by the linear approximation) on the vertical axis becomes the allowable value U. That is, the information processing device 3 calculates a coordinate value of point 102 on the horizontal axis. The information processing device 3 calculates the available production quantity by deducting, from the calculated value Nb, cumulative production quantity Na at a point among three points showing three production indices belonging to the steep section Pb at which the value of the cumulative production quantity is the largest.

As stated above, according to the information processing device 3, the remaining production quantity that can be produced by the current consumables can be predicted based on the production index determined to belong to the steep section Pb and the allowable value relating to the production index.

(5) Processing in Slow Section

Figure 11:
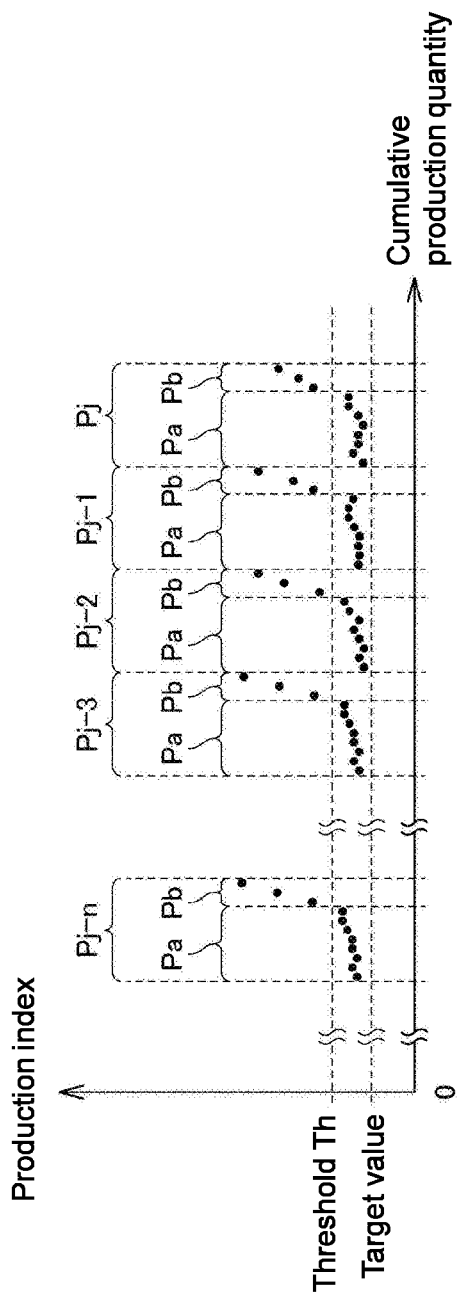
FIG. 11 is a diagram for explaining processing using a production index determined to belong to a slow section.

FIG. 11 is a diagram for explaining processing using a production index determined to belong to the slow section Pa. In detail, FIG. 11 is a diagram for explaining the processing in steps S16 and S17 in FIG. 5.

Referring to FIG. 11, during practical use of the production device 2, the information processing device 3 classifies the production indices into the slow section Pa and the steep section Pb in each replacement cycle (for example, each replacement cycle until a replacement cycle Pj) of the consumables based on the threshold Th. Moreover, j is an arbitrary natural number greater than n.

The information processing device 3 infers a factor that reduces the quality of the product based on the production indices in each slow section Pa in each replacement cycle. The case where there is association with ID and the case where there is no association with ID are separately explained below.

(5.1) Association with ID is Absent

Figure 12:
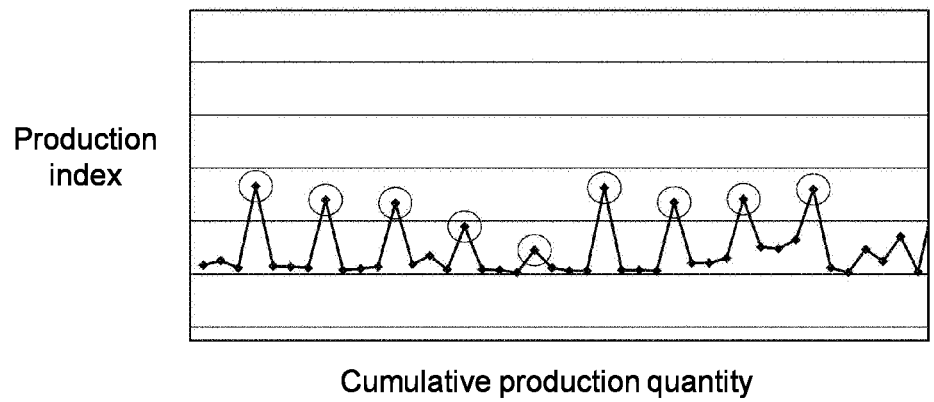
FIG. 12 is a diagram obtained when only the slow sections are extracted from replacement cycles and are rearranged.

FIG. 12 is a diagram obtained when only the slow sections Pa are extracted from the replacement cycles shown in FIG. 11 and are rearranged (combined). FIG. 12 is also a diagram obtained by deleting the steep sections Pb from FIG. 11 and moving the slow sections Pa in the horizontal axis direction.

Referring to FIG. 12, according to the horizontal axis, peaks of the production index appear continuously. For convenience of explanation, each peak is clearly indicated by being surrounded by a circle.

The information processing device 3 infers a factor that causes the production index to deteriorate from the number of places, the number of components used for production, the number of jigs used, the number of stages (see the factors of the long-term change in FIG. 2) and periodicity of reduction of the production index.

As an example, in the following, the number of places is set to ten, the number of components is set to three, the number of jigs is set to four, and the number of stages is set to two.

Figure 13:
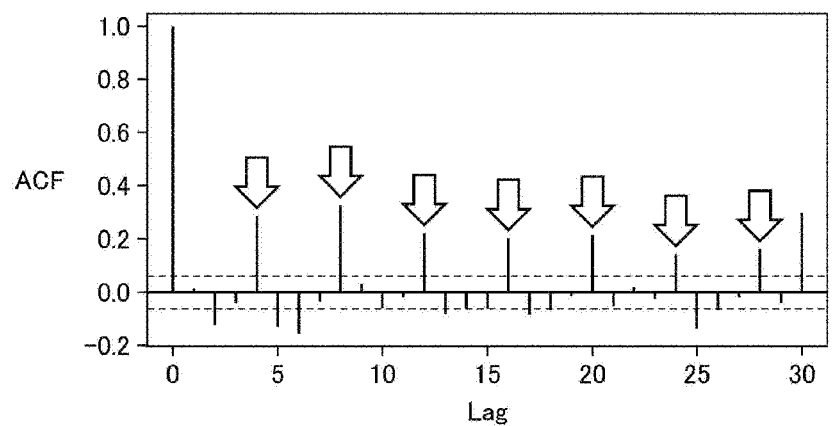
FIG. 13 is a diagram showing an example of a period analysis.

FIG. 13 is a diagram showing an example of a period analysis.

Referring to FIG. 13, as shown by the arrows in the drawing, autocorrelation functions are increased by a factor of 4. According to this, considering the number of places, the number of components, the number of jigs and the number of stages, the user can determine that one of the jigs (the number thereof is four) is the factor that causes the production index to deteriorate.

Accordingly, it becomes possible for the user to increase the production index by inspecting the four jigs and replacing or cleaning the jig among the four jigs that is degraded or has become dirty.

(5.2) Association with ID is Present

In the case where the production index is associated with a plurality of IDs, the information processing device 3 infers the factor that causes the production index to deteriorate by using these IDs. Similarly, in this case, as explained based on FIG. 12, only the slow sections Pa are extracted from the replacement cycles.

In the following explanation, as an example, the number of stages with ID is set to two, the number of components with ID is set to three, the number of jigs with ID is set to four, and the number of places with ID is set to twelve. In addition, the information processing device 3 uses, as an example of a determination indicator of the factor of reduction of the production index, a value obtained by adding triple a median absolute deviation (MAD) to a median.

FIG. 14A to FIG. 14D are diagrams showing the production indices by ID.

Figure 14A:
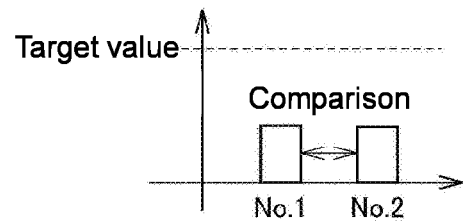
FIG. 14A to FIG. 14D are diagrams showing the production indices by ID.
Figure 14B:
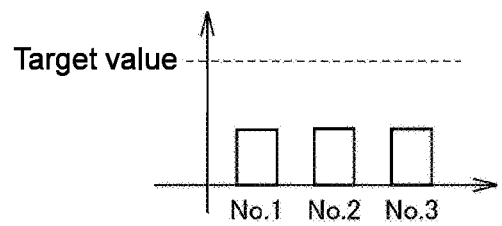
Figure 14C:
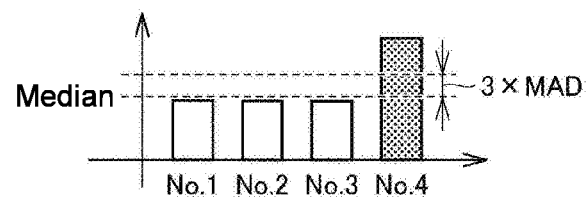
Figure 14D:
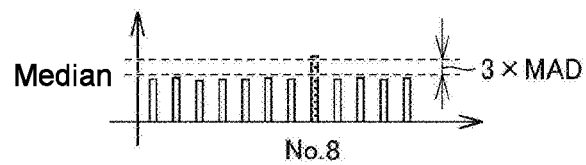

Referring to FIG. 14A to FIG. 14D, FIG. 14A is the production indices of the stages and shows the production index for each identification information. FIG. 14B is the production indices of the components and shows the production index for each identification information. FIG. 14C is the production indices of the jigs and shows the production index for each identification information. FIG. 14D is the production indices of the places and shows the production index for each identification information.

In FIG. 14C, it is clear that the production index of the jig No. 4 among the four jigs exceeds the determination indicator (the median plus 3×MAD). According to this, the user or the information processing device 3 can determine that the jig No. 4 is the factor that causes the production index to deteriorate.

In addition, in FIG. 14D, it is clear that the production index of the place No. 8 among the twelve places exceeds the determination indicator. According to this, the user or the information processing device 3 can determine that the place No. 8 is the factor that causes the production index to deteriorate.

In this manner, even if there are a plurality of factors that cause the production index to deteriorate, by using the ID, the user or the information processing device 3 can specify the factors.

[B. Hardware Configuration]

Figure 15:
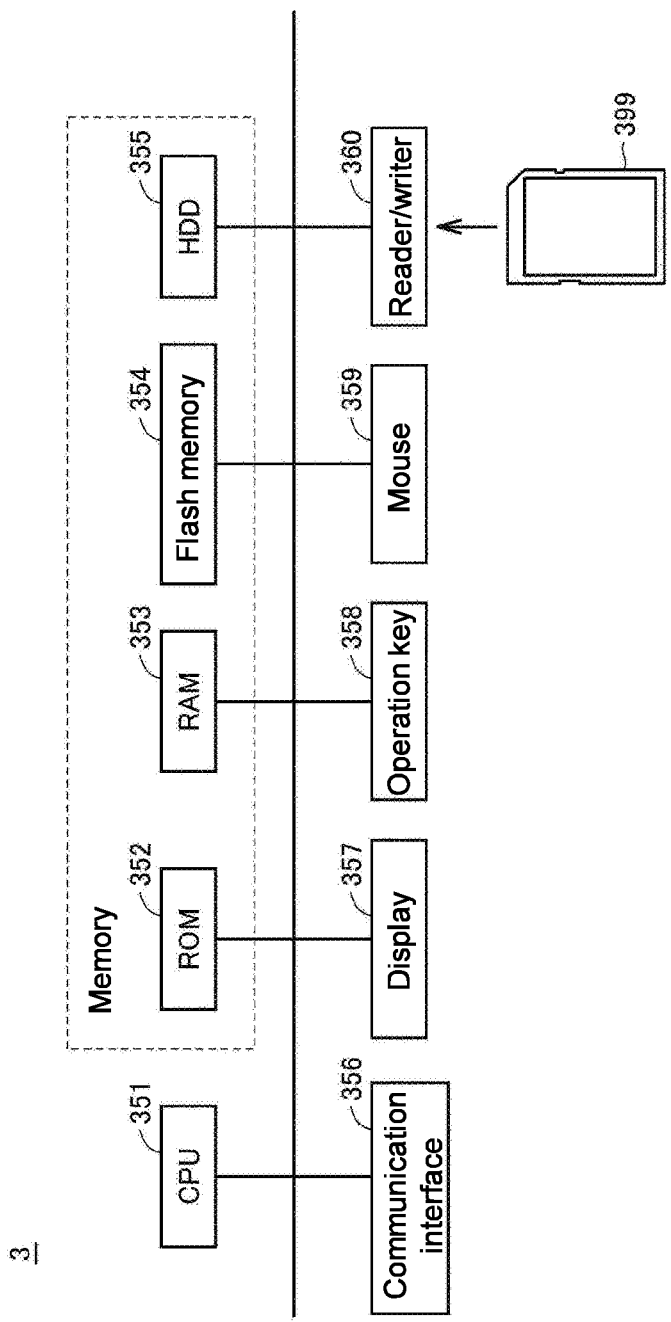
FIG. 15 is a diagram for explaining a typical hardware configuration of the information processing device.

FIG. 15 is a diagram for explaining a typical hardware configuration of the information processing device 3.

Referring to FIG. 15, the information processing device 3 typically includes a central processing unit (CPU) 351, a read-only memory (ROM) 352, a random access memory (RAM) 353, a flash memory 354, a hard disk drive (HDD) 355, a communication interface (IF) 356, a display 357, an operation key 358, a mouse 359, and a reader/writer 360 performing data reading and writing on a memory medium 399. Since these devices have been conventionally known, they are not explained in detail herein.

[C. Functional Configuration]

Figure 16:
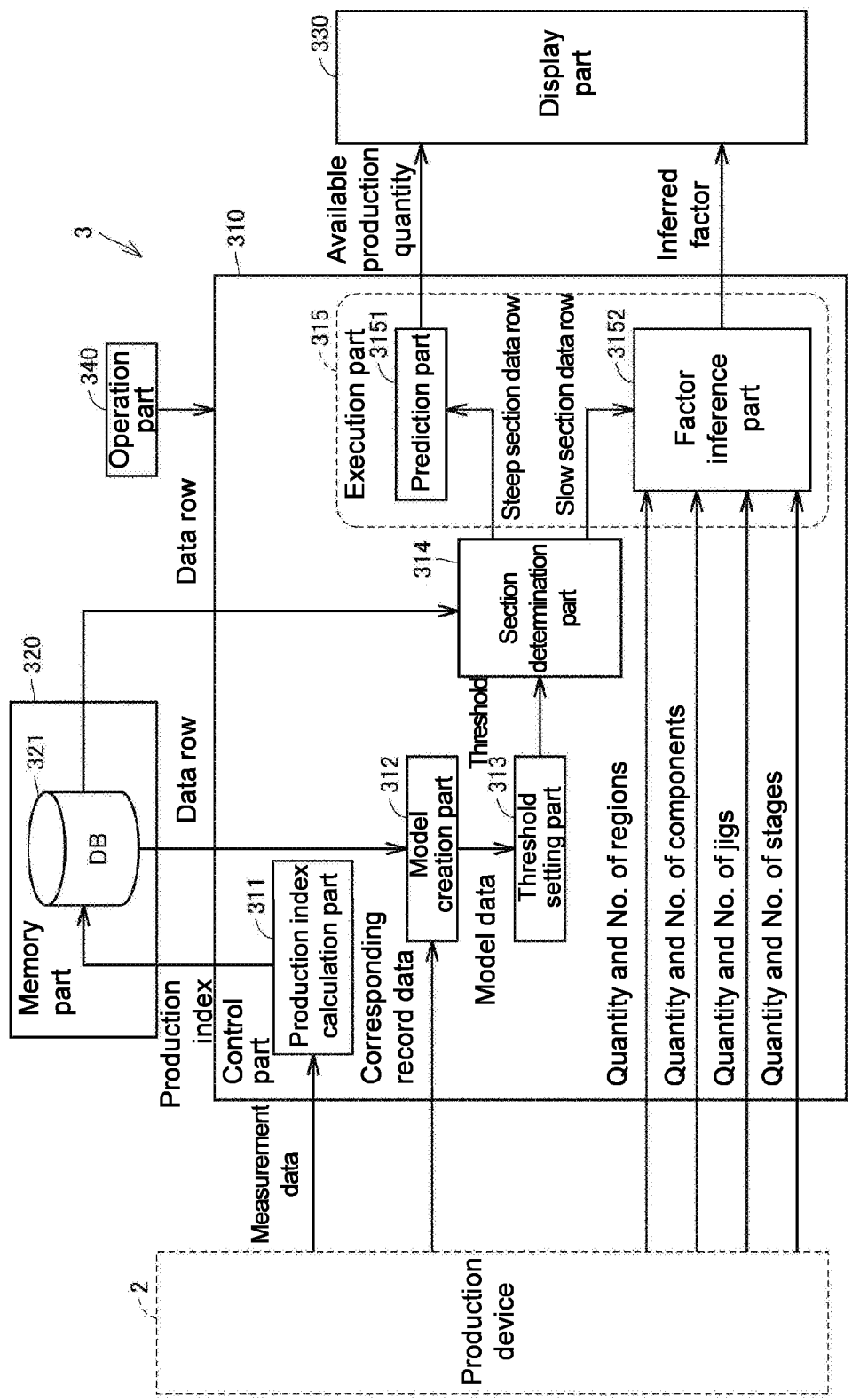
FIG. 16 is a diagram for explaining a functional configuration of the information processing device.

FIG. 16 is a diagram for explaining a functional configuration of the information processing device 3.

Referring to FIG. 16, the information processing device 3 includes a control part 310, a memory part 320, a display part 330, and an operation part 340. The control part 310 includes a production index calculation part 311, a model creation part 312, a threshold setting part 313, a section determination part 314, and an execution part 315. The execution part 315 includes a prediction part 3151 and a factor inference part 3152. The memory part 320 has a database 321.

The control part 310 controls overall operation of the information processing device 3.

The production index calculation part 311 calculates a production index based on various measurement data acquired from the production device 2. The production index calculation part 311 stores the calculated production index in the database 321. In the database 321, the production index and ID associated with the production index are associated with cumulative production quantity and then stored.

The control part 310 may acquire the cumulative production quantity itself from the production device 2, or may count the cumulative production quantity based on predetermined information sent from the production device 2. The method of acquiring the cumulative production quantity is not particularly limited.

The model creation part 312 acquires, from the production device 2, corresponding record data that represents the replacement of the consumables. Moreover, the corresponding record may be configured to be input by the operation part 340. The model creation part 312 generates a model based on the production index and so on stored in the database 321 and the corresponding record data. The model creation part 312 typically generates a model curve (see graph (a) to graph (c) of FIG. 6). The model creation part 312 sends data (model data) representing the generated model to the threshold setting part 313.

The threshold setting part 313 sets the threshold Th based on the model data. For example, the threshold Th is calculated as explained based on FIG. 8 or FIG. 9. Moreover, as explained based on FIG. 7, the control part 310 may be configured to receive a user input of the threshold Th via the operation part 340. The threshold setting part 313 sends the set threshold Th to the section determination part 314.

The section determination part 314 determines whether the production indices sequentially calculated during practical use and sequentially stored in the database 321 are data belonging to the slow section Pa or data belonging to the steep section Pb, using the set threshold Th.

The section determination part 314 sends a production index (data row) belonging to the steep section Pb to the prediction part 3151. The section determination part 314 sends a production index (data row) belonging to the slow section Pa to the factor inference part 3152.

The execution part 315 executes the processing Qa that uses the production index determined to belong to the slow section Pa and the processing Qb that uses the production index determined to belong to the steep section Pb.

Specifically, the prediction part 3151 in the execution part 315 predicts the remaining production quantity (namely, the available production quantity) that can be produced by the consumables based on the allowable value relating to the production index, as the processing Qb (see FIG. 10). In this case, the control part 310 causes the display part 330 to display the predicted available production quantity.

Place-related data (such as number of regions, numbers as ID), component-related data (such as number of components, numbers as ID), jig-related data (such as number of jigs, numbers as ID), and stage-related data (such as number of stages, numbers as ID) are input to the factor inference part 3152 in the execution part 315. These data are typically sent from the production device 2.

The factor inference part 3152 infers the device element that causes the production index to deteriorate using the above data sent from the production device 2 and the data belonging to the slow section Pa, as the processing Qa. In this case, the control part 310 causes the display part 330 to display the inferred factor.

In detail, in the case where the production index is not associated with any ID, the factor inference part 3152 infers from among a plurality of device elements a device element that causes the production index to deteriorate, based on periodicity of deterioration of the production index belonging to the slow section Pa that relates to the cumulative production quantity of the product (see FIG. 13).

In addition, in the case where the production index is associated with ID, the factor inference part 3152 infers from among a plurality of device elements a device element that was used for production of the product when the production index has deteriorated, based on the production index belonging to the slow section Pa and the identification information associated with the production index (see FIG. 14A to FIG. 14D).

Moreover, a display manner of the inferred factor may be clearly showing the factor itself, or may be indirectly displaying the factor using a graph (relying on the user to determine the factor). The display manner is not particularly limited.

The control part 310 controls the components including the CPU 351, the ROM 352, the RAM 353 and so on shown in FIG. 15 according to information processing. The memory part 320 is, for example, an auxiliary memory such as the HDD 355, a solid-state drive or the like, and stores program executed by the control part 310, the database (DB) 321 and so on.

The memory medium 399 is a medium accumulating information of a program or the like recorded in a computer or other device, machine or the like by electrical, magnetic, optical, mechanical or chemical action so that information of the program or the like can be read. The information processing device 3 may acquire data of the above-mentioned program or the production index from the memory medium 399.

Moreover, the control part 310 may be configured to cause the execution part 315 to execute at least one of the processing Qa and the processing Qb.

[D. User Interfaces]

Various user interfaces displayed by the display 357 (display part 330) of the information processing device 3 are explained.

(1) Overall Section

Figure 17:
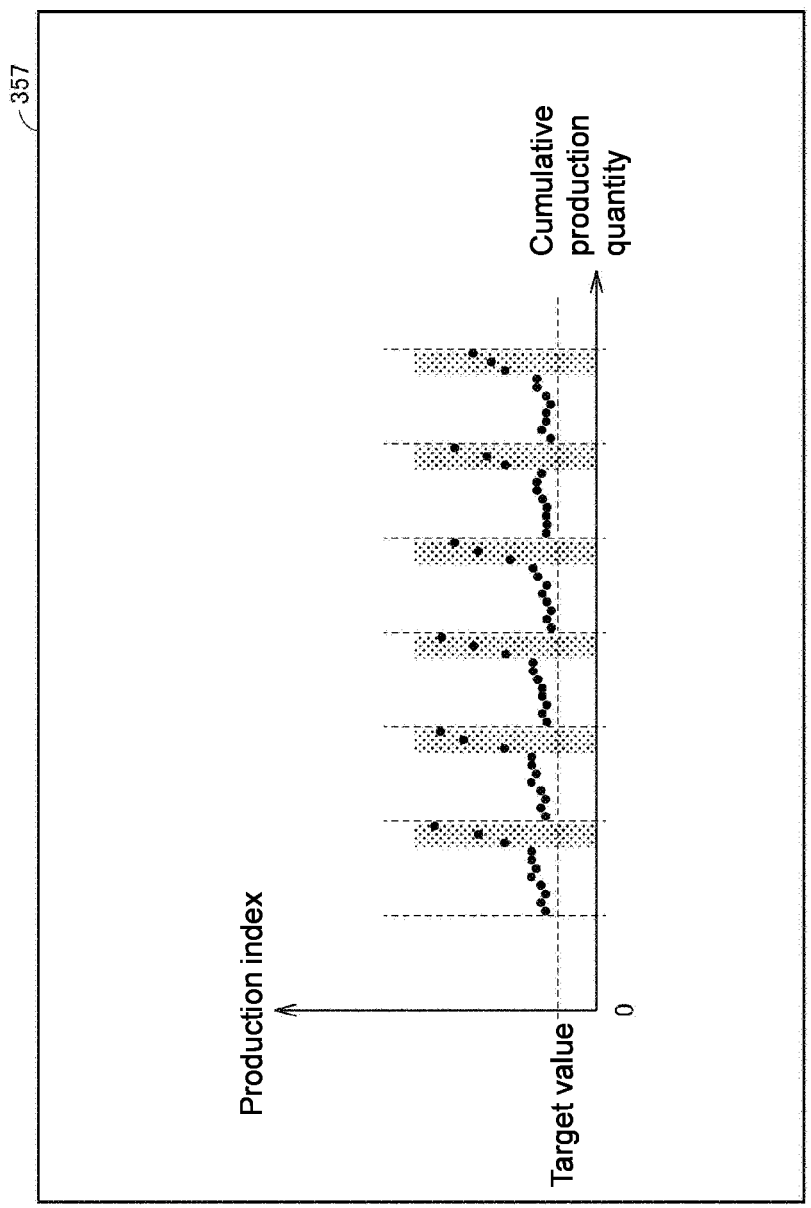
FIG. 17 is a display screen example of the information processing device.

FIG. 17 is a display screen example of the information processing device 3.

Referring to FIG. 17, the information processing device 3 causes the display 357 (display part 330) to display a screen distinguishing between the slow section Pa and the steep section Pb for each replacement cycle. Moreover, data is plotted in the slow section Pa and the steep section Pb.

(2) Steep Section

Figure 18:
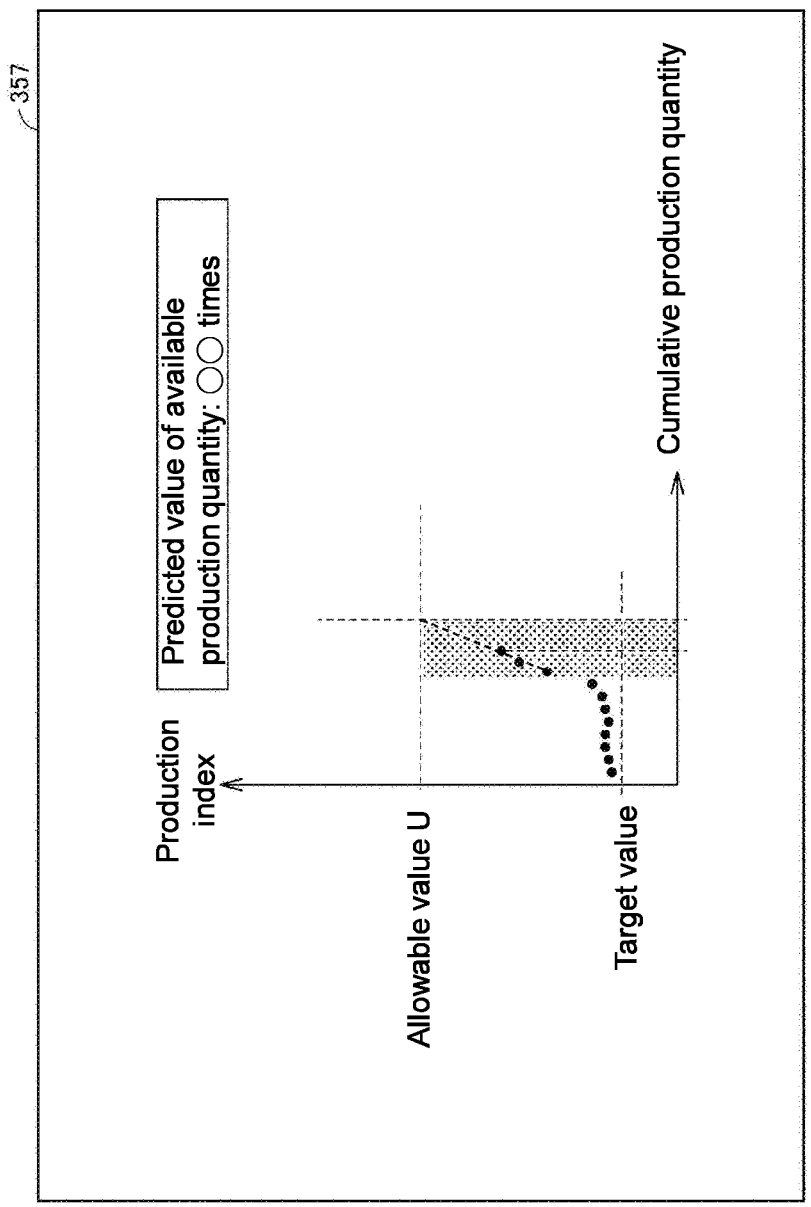
FIG. 18 is a display screen example relating to the steep section.

FIG. 18 is a display screen example relating to the steep section Pb. In detail, FIG. 18 is a diagram showing a prediction result.

Referring to FIG. 18, the information processing device 3 displays a predicted value of the available production quantity. Typically, the information processing device 3 displays on the display 357 the predicted value together with the data of the production index of the steep section Pb and the straight line (the straight line 101 in FIG. 10) obtained by the linear approximation. According to this, the user can know the available production quantity with the current consumables.

(3) Slow Section

Figure 19:
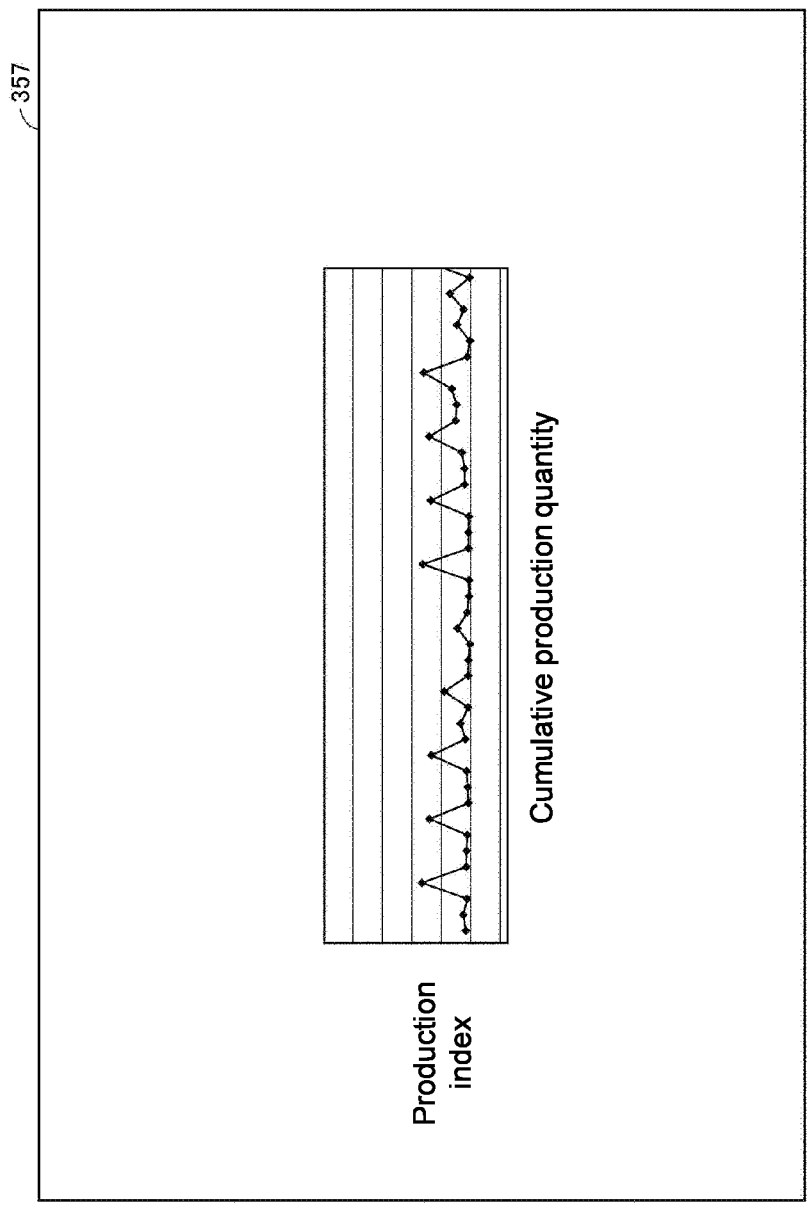
FIG. 19 is a screen example showing data obtained when only the slow sections are extracted from the replacement cycles and are rearranged.

FIG. 19 is a screen example showing data (see FIG. 12) obtained when only the slow sections Pa are extracted from the replacement cycles and are rearranged (combined). Referring to FIG. 19, the user can determine whether there is some sort of periodicity or not in a value of the production index by confirming the screen.

Figure 20:
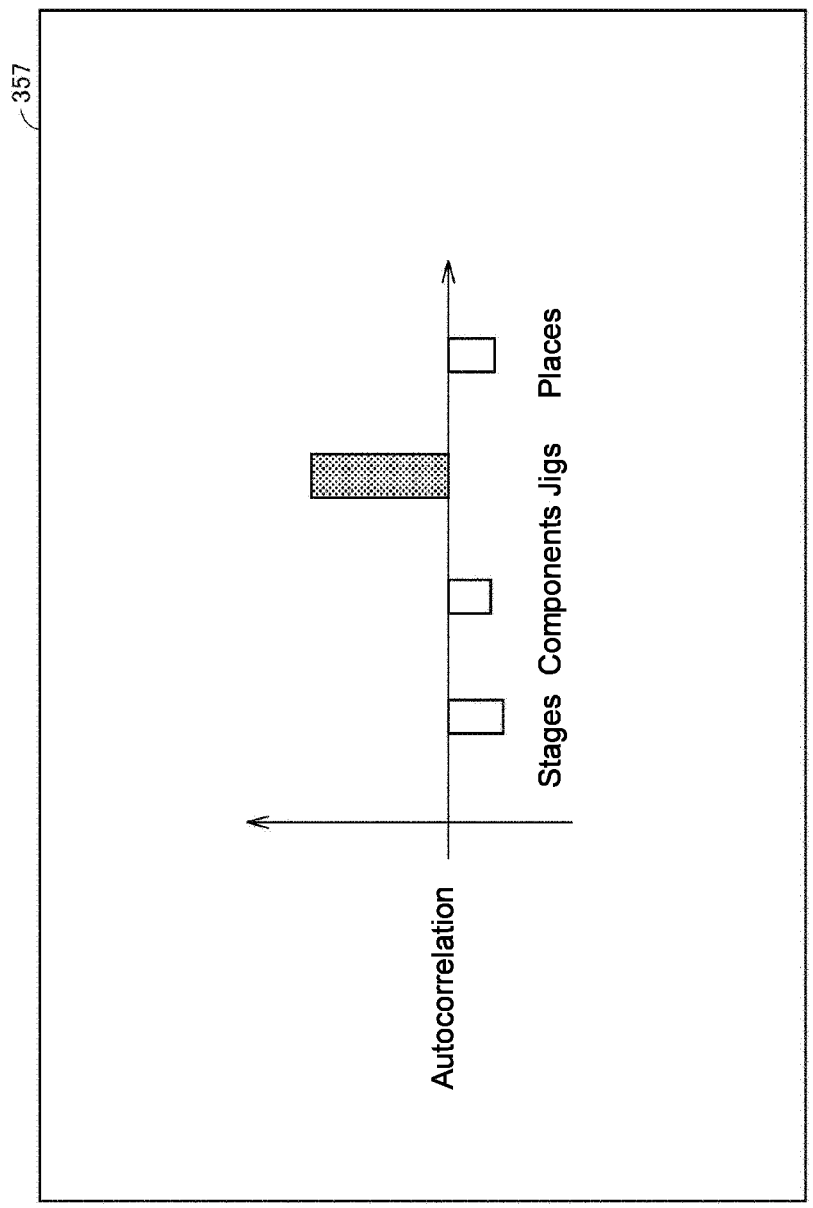
FIG. 20 is a screen example displayed based on a result of the period analysis in a case where there is no association with ID.

FIG. 20 is a screen example displayed based on a result of the period analysis (see FIG. 13) in the case where there is no association with ID.

Referring to FIG. 20, the information processing device 3 calculates an autocorrelation for each of stages, components, jigs and places. The information processing device 3 associates the calculated autocorrelations with the stages, components, jigs and places respectively and displays the autocorrelations on the display 357. According to this, the user can determine from among the stages, components, jigs and places the factor that causes the production index to deteriorate. In the example of FIG. 20, the user can determine that one of the four jigs causes the production index to deteriorate.

Figure 21:
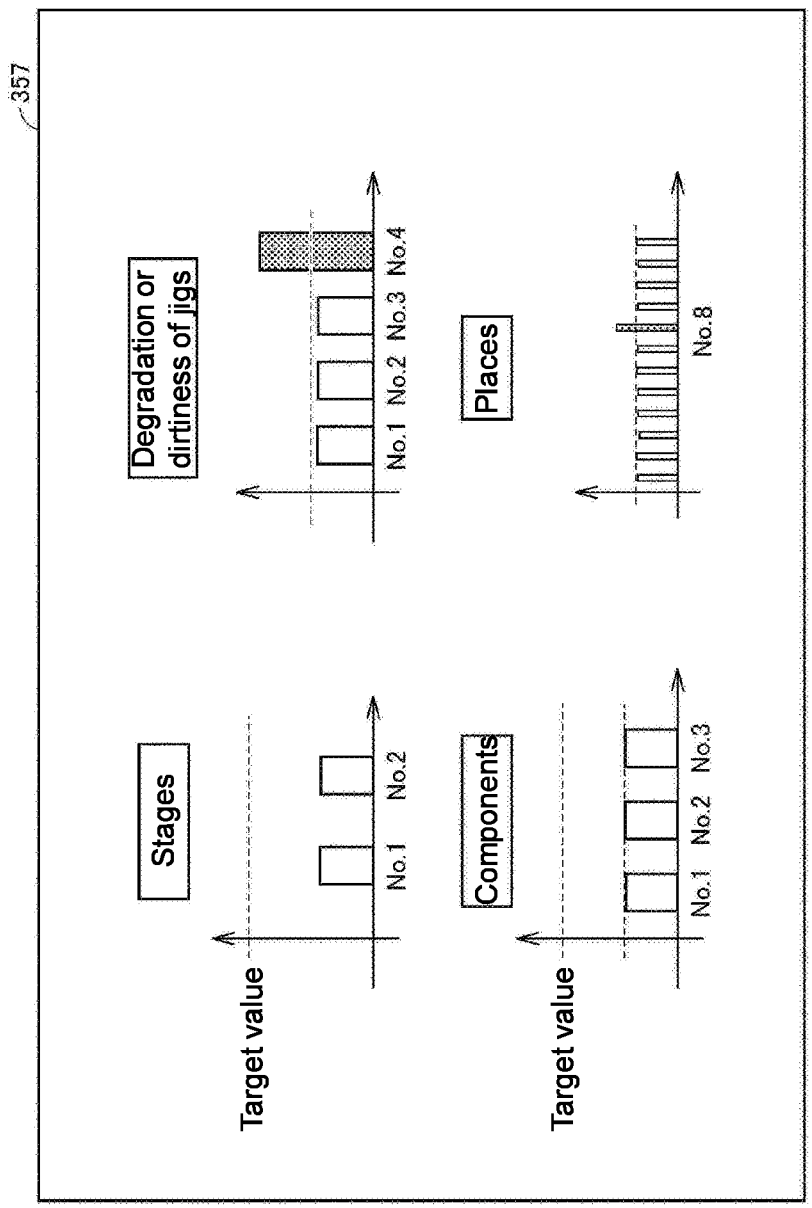
FIG. 21 is a screen example showing the production indices by factor of long-term change in a case where there is association with ID.

FIG. 21 is a screen example showing the production indices (see FIG. 14A to FIG. 14D) by factor of the long-term change in the case where there is association with ID.

Referring to FIG. 21, the information processing device 3 causes the display 357 to display the production indices and target values with respect to each of the stages, jigs, components and places. Particularly, the information processing device 3 displays a production index that exceeds the determination indicator in a display mode distinguishable from the other production indices.

In the example of FIG. 21, the information processing device 3 makes the display mode of the bar of the production index of the jig No. 4 among the four jigs and the bar of the production index of the place No. 8 among the twelve places different from the display mode of the other bars.

According to this, it is possible for the user to promptly grasp the factor that causes the production index to deteriorate.

[E. Modifications]

(1) Setting of Threshold

In the above, an embodiment in which the slow section Pa and the steep section Pb are continuously classified without overlapping in one replacement cycle using one threshold Th has been explained by giving an example. However, the disclosure is not limited thereto. Other embodiments are explained in the following.

(1.1) First Modification

Figure 22:
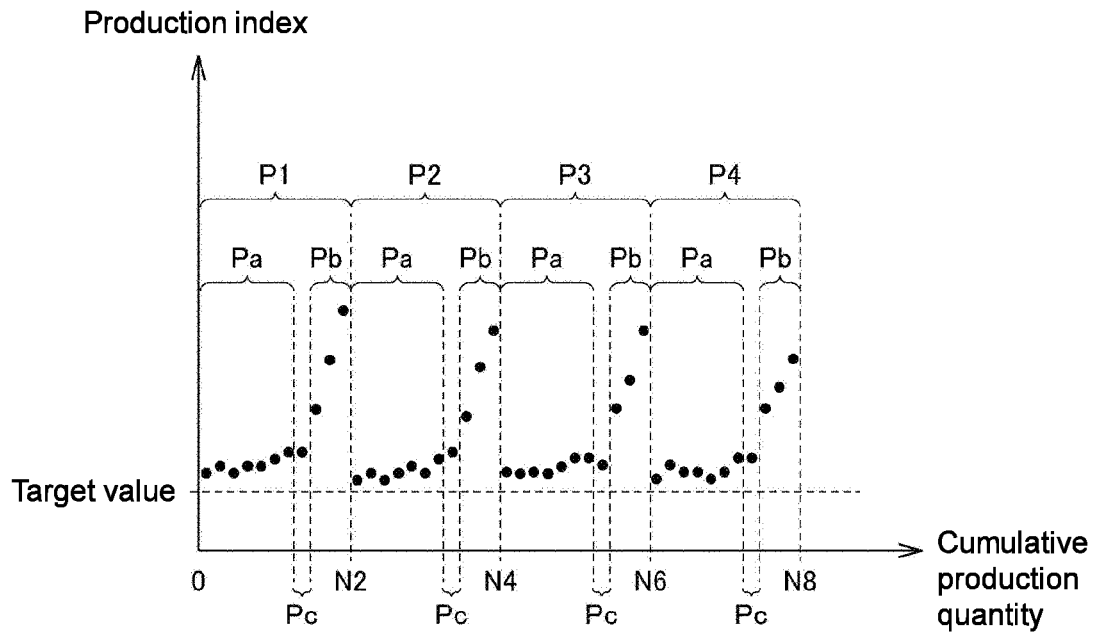
FIG. 22 is a diagram for explaining a case where the slow section and the steep section are set separated in one replacement cycle.

FIG. 22 is a diagram for explaining a case where the slow section Pa and the steep section Pb are set separated in one replacement cycle.

Referring to FIG. 22, a buffer section Pc is set between the slow section Pa and the steep section Pb. By providing such buffer section Pc, a difference between a change in the production index in the slow section Pa and a change in the production index in the steep section Pb becomes clearer than the case where no buffer section Pc is provided.

Figure 23:
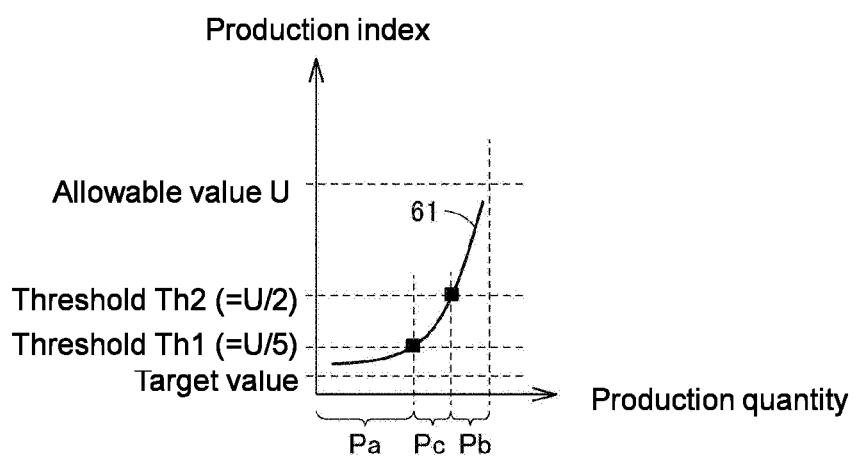
FIG. 23 is a diagram for explaining a threshold setting method for providing a buffer section.

FIG. 23 is a diagram for explaining a threshold setting method for providing the buffer section Pc. FIG. 23 is also a diagram for explaining a case where the user or the manufacturer or the like sets the threshold Th based on an allowable value similarly as explained based on FIG. 7.

Referring to FIG. 23, the user or the like sets values obtained by multiplying the allowable value U of the production index by predetermined ratios as two thresholds Th1 and Th2. In the example of FIG. 23, the value (U/5) obtained by multiplying the allowable value U by ⅕ is set as the threshold Th1, and the value (U/2) obtained by multiplying the allowable value U by ½ is set as the threshold Th2.

By setting such thresholds Th1 and Th2, a section of production quantity corresponding to a section equal to or greater than the threshold Th1 and less than the threshold Th2 becomes the buffer section Pc. In addition, a section of production quantity corresponding to a section less than the threshold Th1 becomes the slow section Pa. Furthermore, a section of production quantity corresponding to a section equal to or greater than the threshold Th2 becomes the steep section Pb.

The execution part 315 (FIG. 16) does not use data of the buffer section Pc for the prediction of the available production quantity and the factor inference. Hence, compared to the case where no buffer section Pc is set, it becomes possible to increase accuracy of the predicted value of the available production quantity and it also becomes possible to perform the factor inference with high precision.

Figure 24:
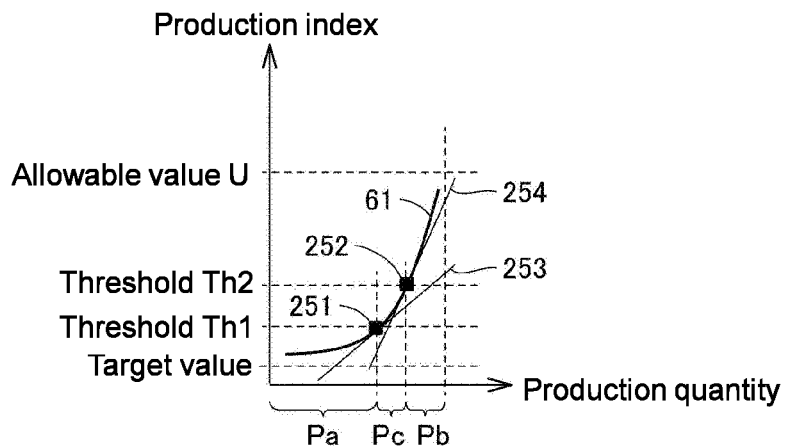
FIG. 24 is a diagram for explaining another threshold setting method for providing the buffer section.

FIG. 24 is a diagram for explaining another threshold setting method for providing the buffer section Pc. FIG. 24 is also a diagram for explaining a case where the information processing device 3 automatically calculates a threshold using a model curve similarly as explained based on FIG. 9.

Referring to FIG. 24, the information processing device 3 calculates the thresholds Th1 and Th2 using the model curve 61. In detail, when the production quantity is increased, boundary points 251 and 252 at which the rate of change in the model curve 61 exceeds two mutually different fixed values for the first time are calculated. In the case of FIG. 24, as an example, the information processing device 3 calculates the boundary point 251 at which the rate of change becomes 0.2 or greater and the boundary point 252 at which the rate of change becomes 0.4 or greater. Moreover, a straight line 253 represents a straight line having an inclination (rate of change) of 0.2, and a straight line 254 represents a straight line having an inclination (rate of change) of 0.4.

In this manner, in the case where the rate of change is used, similarly to the above, it becomes possible to increase accuracy of the predicted value of the available production quantity and it also becomes possible to perform the factor inference with high precision.

(1.2) Second Modification

Figure 25:
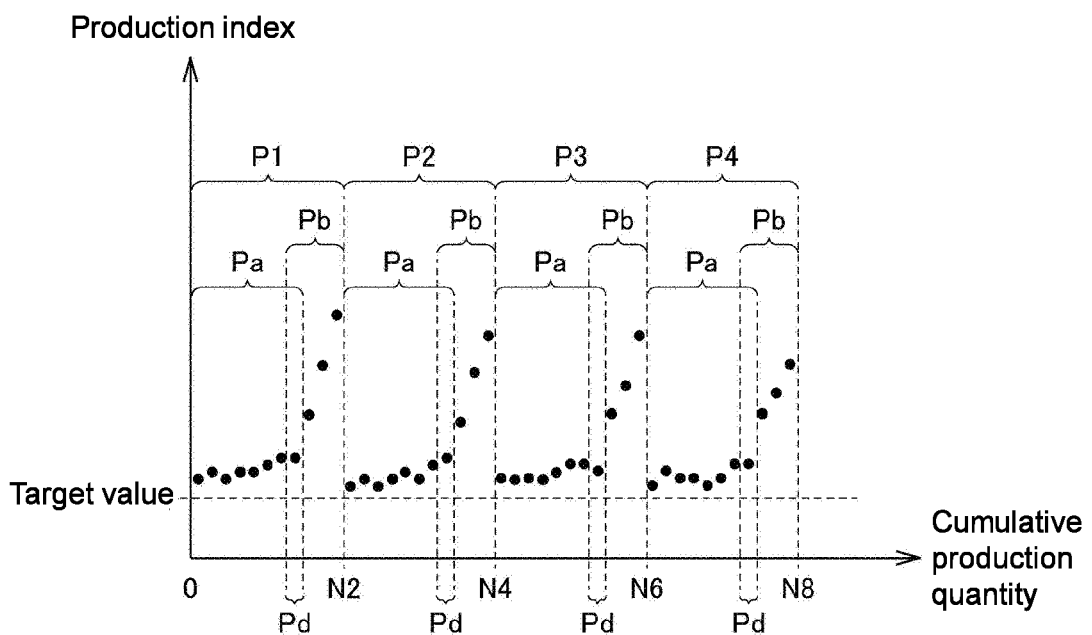
FIG. 25 is a diagram for explaining a case where the slow section and the steep section are set to partially overlap in one replacement cycle.

FIG. 25 is a diagram for explaining a case where the slow section Pa and the steep section Pb are set to partially overlap in one replacement cycle.

Referring to FIG. 25, an overlap section Pd is set in which a portion of the slow section Pa and a portion of the steep section Pb overlap. By providing such overlap section Pd, data quantity of the production indices in the slow section Pa and the steep section Pb can be increased.

Figure 26:
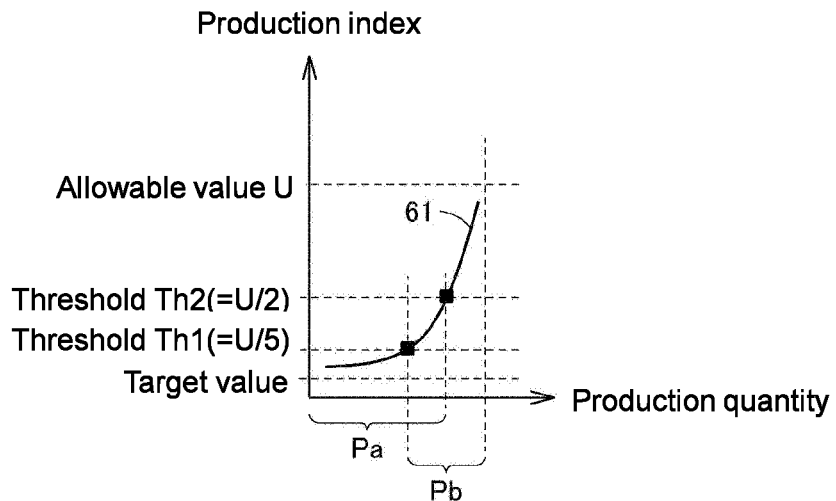
FIG. 26 is a diagram for explaining a threshold setting method for providing an overlap section.

FIG. 26 is a diagram for explaining a threshold setting method for providing the overlap section Pd. FIG. 26 is also a diagram for explaining a case where the user or the manufacturer or the like sets the threshold Th based on an allowable value similarly as explained based on FIG. 7.

Referring to FIG. 26, the user or the like sets values obtained by multiplying the allowable value U of the production index by predetermined ratios as two thresholds Th1 and Th2. In the example of FIG. 26, similarly to the example of FIG. 23, the value (U/5) obtained by multiplying the allowable value U by ⅕ is set as the threshold Th1, and the value (U/2) obtained by multiplying the allowable value U by ½ is set as the threshold Th2.

By setting such thresholds Th1 and Th2, a section of production quantity corresponding to a section equal to or greater than the threshold Th1 and less than the threshold Th2 becomes the overlap section Pd. In addition, a section of production quantity corresponding to a section less than the threshold Th2 becomes the slow section Pa. Furthermore, a section of production quantity corresponding to a section equal to or greater than the threshold Th1 becomes the steep section Pb.

Figure 27:
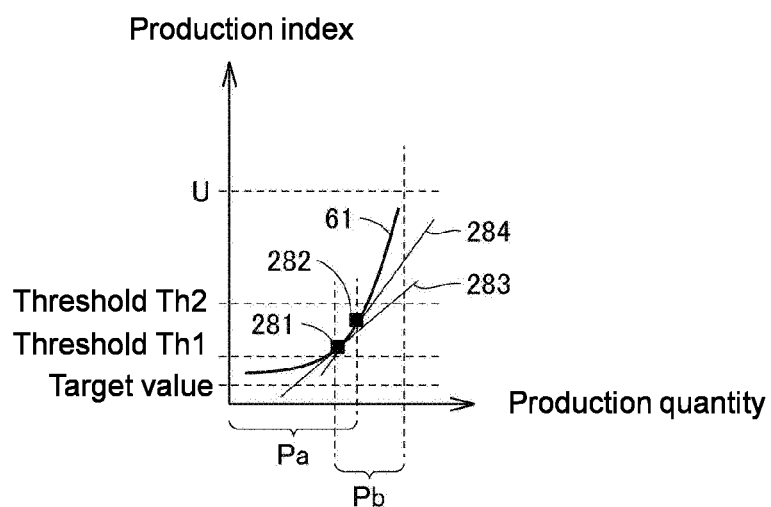
FIG. 27 is a diagram for explaining another threshold setting method for providing the overlap section.

FIG. 27 is a diagram for explaining another threshold setting method for providing the overlap section Pd. FIG. 27 is also a diagram for explaining a case where the information processing device 3 automatically calculates a threshold using a model curve similarly as explained based on FIG. 9.

Referring to FIG. 27, the information processing device 3 calculates the thresholds Th1 and Th2 using the model curve 61. In detail, the value on the horizontal axis (production quantity) is increased, and boundary points 281 and 282 at which the rate of change in the model curve 61 exceeds two mutually different fixed values for the first time are calculated. In the case of FIG. 27, as an example, the information processing device 3 calculates the boundary point 281 at which the rate of change becomes 0.2 or greater and the boundary point 282 at which the rate of change becomes 0.3 or greater. Moreover, a straight line 283 represents a straight line having an inclination (rate of change) of 0.2, and a straight line 284 represents a straight line having an inclination (rate of change) of 0.3.

(2) Prediction of Available Production Quantity

In cases such as where a product is produced through a plurality of processes, an evaluation of quality at each process is often carried out after the final process has ended. In addition, in such cases, in order to predict the available production quantity at each process, it is necessary to estimate a delay from end of the process until an inspection. In the following, an explanation is given of a configuration enabling a precise prediction of the available production quantity in a case where such a measurement delay occurs.

Figure 28:
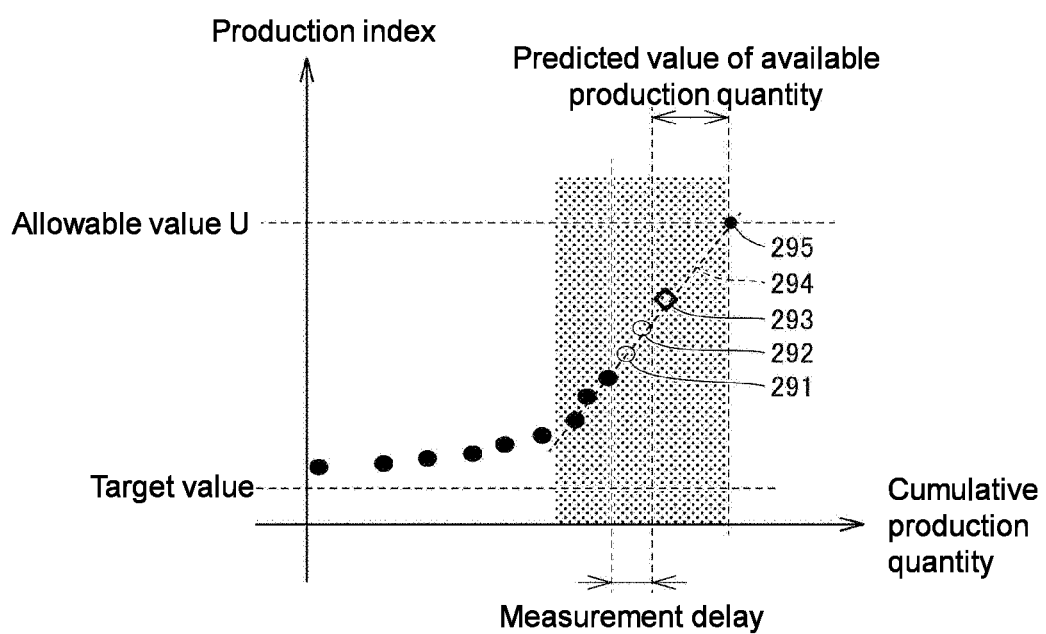
FIG. 28 is a diagram for explaining available production quantity at the time when a measurement delay occurs.

FIG. 28 is a diagram for explaining the available production quantity at the time when a measurement delay occurs.

Referring to FIG. 28, a measurement delay represents a quantity of work-in-process from a target process until an inspection process.

Circular dots filled with black represent measured values of the production index. Points 291 and 292 represent predicted values. A rhombic dot 293 indicates a current value (estimated value). Moreover, the case of FIG. 28 shows an example in which the measurement delay corresponds to three pieces.

The information processing device 3 estimates the predicted values and the current value based on the measured values of the production index and past data. Furthermore, the information processing device 3 creates a straight line 294 serving as a model based on the measured values of the production index, the predicted values and the current value. When creating the model, the information processing device 3 uses, for example, the most recent three measured values.

The information processing device 3 specifies the cumulative production quantity at the time when the value of the straight line 294 on the vertical axis has become the allowable value U (point 295), and calculates the available production quantity (for example, three pieces) from the specified cumulative production quantity.

Figure 29:
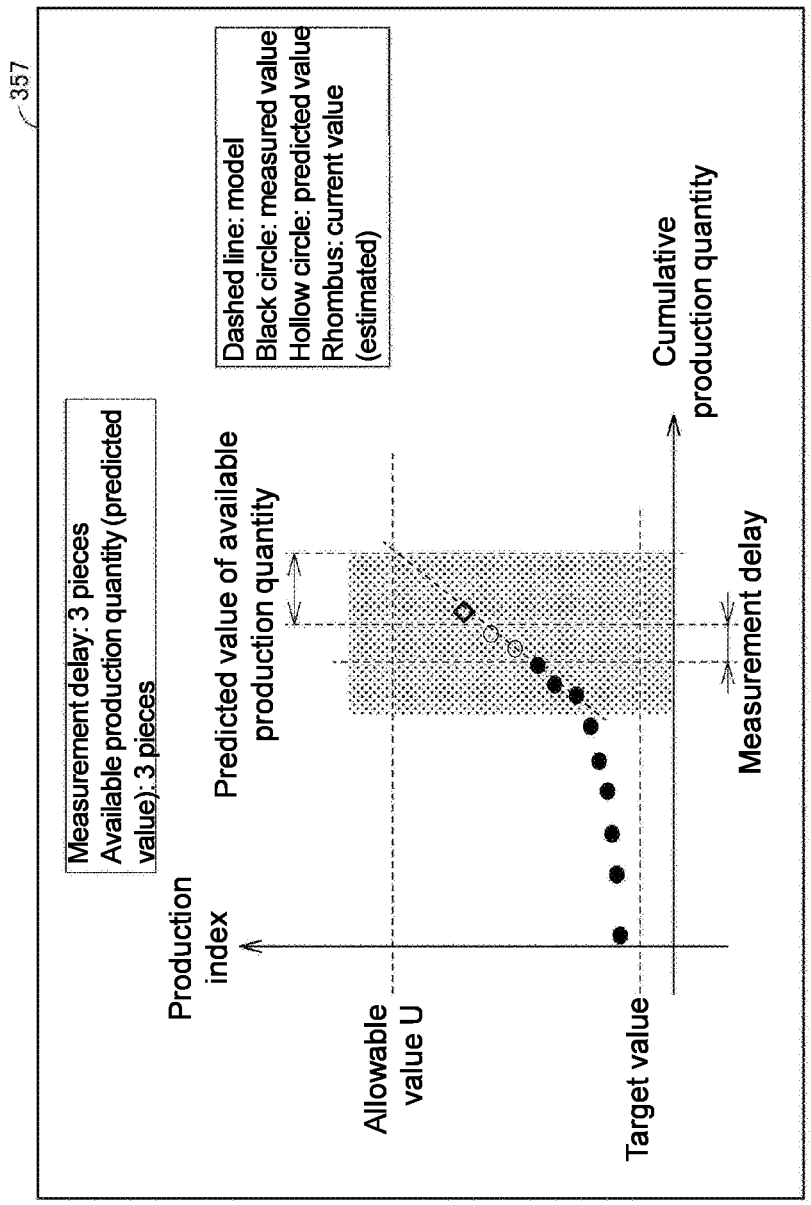
FIG. 29 is a diagram showing a screen example in a case where there is a measurement delay.

FIG. 29 is a diagram showing a screen example in a case where there is a measurement delay.

Referring to FIG. 29, the information processing device 3 displays the graph shown in FIG. 28 on the display 357. Furthermore, the information processing device 3 displays information about the content (data type) of each point, the quantity of the measurement delay and the available production quantity being predicted values.

According to such configuration, even if the measurement delay occurs, it is possible for the user to accurately predict the available production quantity at each process.

§ 3 Specific Examples

In the following, a semiconductor manufacturing device is explained as an example of the production device 2. In addition, in the following, a case is explained where the above-mentioned various processing such as the prediction of the available production quantity and the inference of the factor that causes the production index to deteriorate and so on is applied in a process previous to semiconductor manufacturing.

(1) First Specific Example

Figure 30:
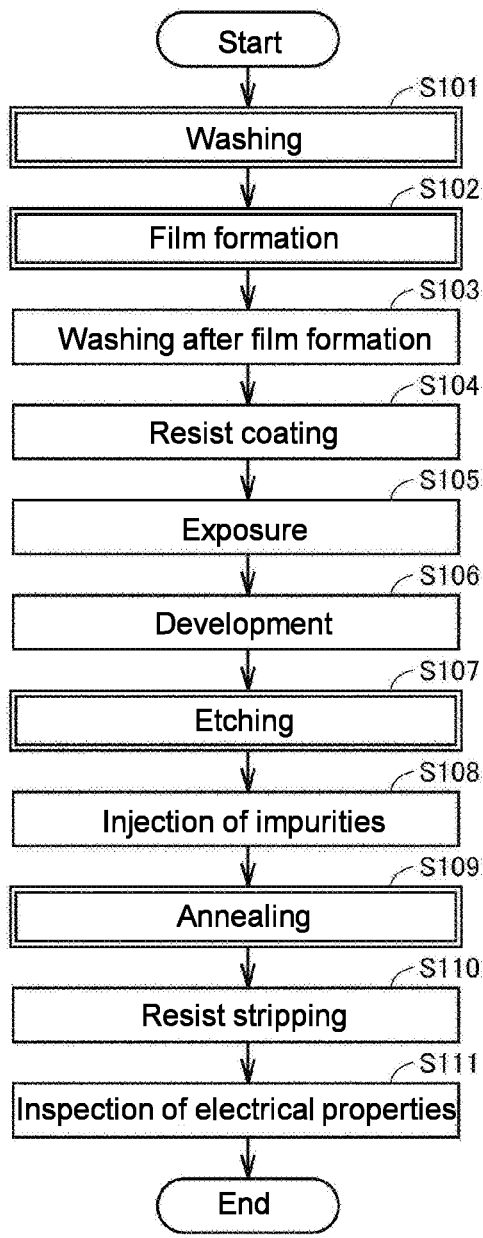
FIG. 30 is a flowchart showing an example of a flow of a preprocessing process in semiconductor manufacturing.

FIG. 30 is a flowchart showing an example of a flow of a preprocessing process in semiconductor manufacturing.

Referring to FIG. 30, in step S101, a substrate is subjected to washing. In step S102, film formation is performed on the substrate. In step S103, the substrate on which the film formation processing was performed is subjected to washing.

In step S104, resist coating is performed on the substrate. In step S105, exposure is performed on the substrate; in step S106, development is performed. In step S107, etching is performed on the substrate; in step S108, injection of impurities is performed.

After that, in step S109, annealing is performed on the etched substrate in an annealing furnace. In step S110, resist stripping is performed; in step S111, an inspection of electrical properties is carried out.

Moreover, the processing from steps S101 to S111 is conventional processing.

The washing processing in step S101 is, for example, batch-type wet washing, and is performed using a designated slot among a plurality of slots. A drug solution is contained in the slot. This washing processing is equivalent to the "places" among the factors of the long-term change (see FIG. 2).

The film formation processing in step S102 is sputtering film formation using a sputtering target. The sputtering target is a consumable and serves as a factor of the short-term change.

The etching in step S108 is, for example, dry etching, and is performed on a designated stage among a plurality of stages. This etching processing is equivalent to the "change in stages" among the factors of the long-term change.

The annealing in step S109 is performed using a designated furnace among a plurality of annealing furnaces. The annealing is related to the "degradation or dirtiness of components" among the factors of the long-term change (see FIG. 2).

In addition, a plurality of wafer cassettes are used in the previous process. The wafer cassettes are jigs. Degradation or dirtiness of the wafer cassettes also serves as a factor of the long-term change.

Figure 31:
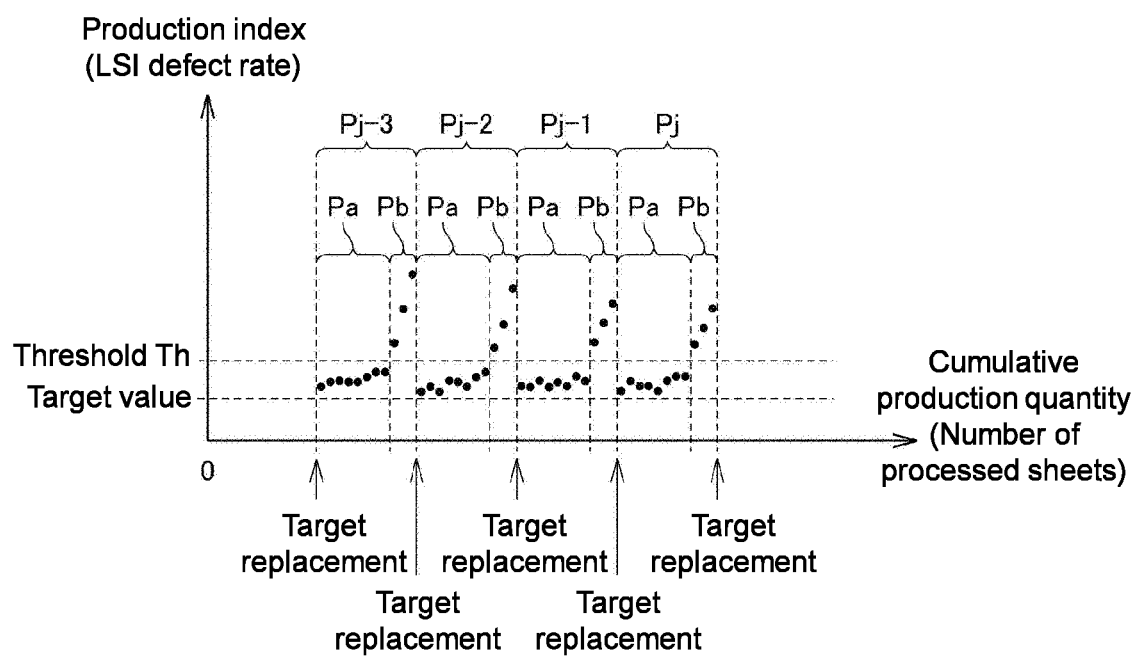
FIG. 31 is a diagram showing a time-series change in large-scale integration (LSI) defect rate as a specific example of the production index.

FIG. 31 is a diagram showing a time-series change in large-scale integration (LSI) defect rate as a specific example of the production index.

Referring to FIG. 31, in the steep section Pb, as the number of processed sheets increases, the LSI defect rate rises greatly. In addition, each time the sputtering target is replaced, the LSI defect rate decreases.

Figure 32:
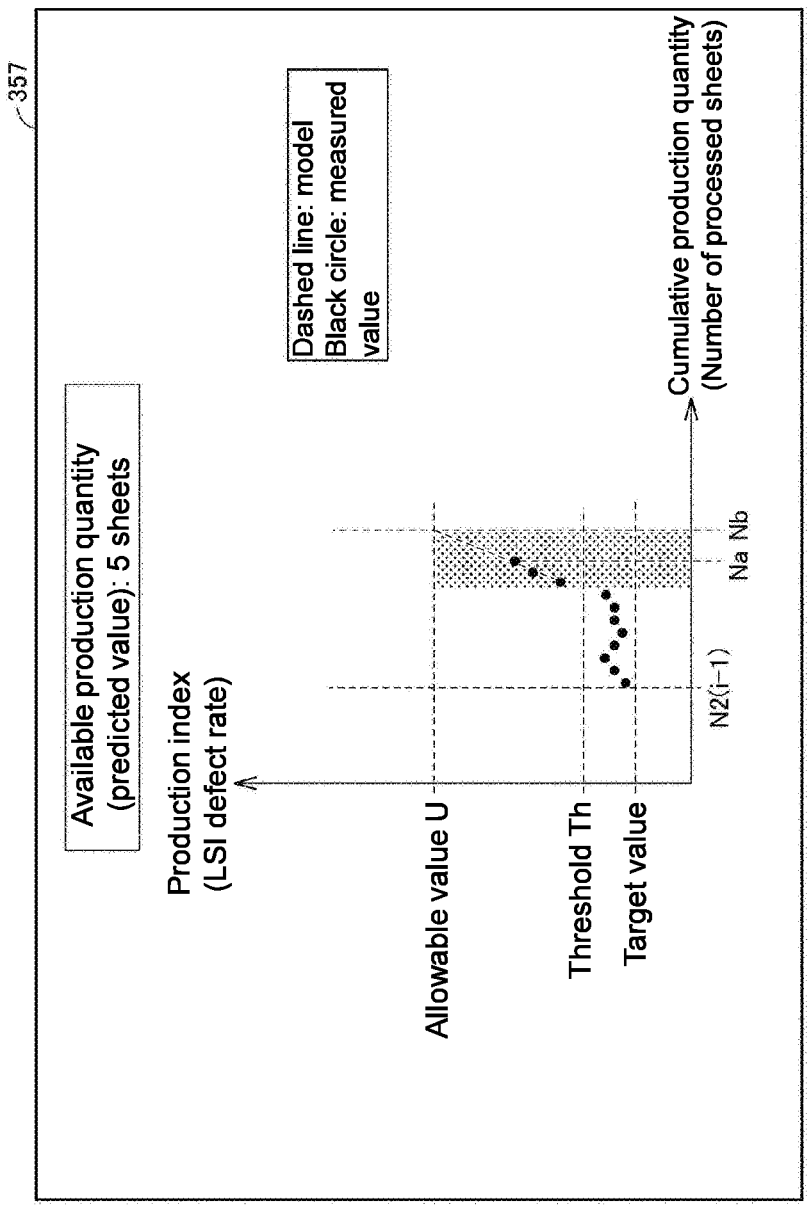
FIG. 32 is a display screen example relating to the steep section.

FIG. 32 is a display screen example relating to the steep section Pb. In detail, FIG. 32 is a diagram (showing a prediction result) corresponding to the screen example of FIG. 18.

Referring to FIG. 32, the information processing device 3 displays on the display 357 a predicted value of the available production quantity together with a straight line of a model and points.

Figure 33:
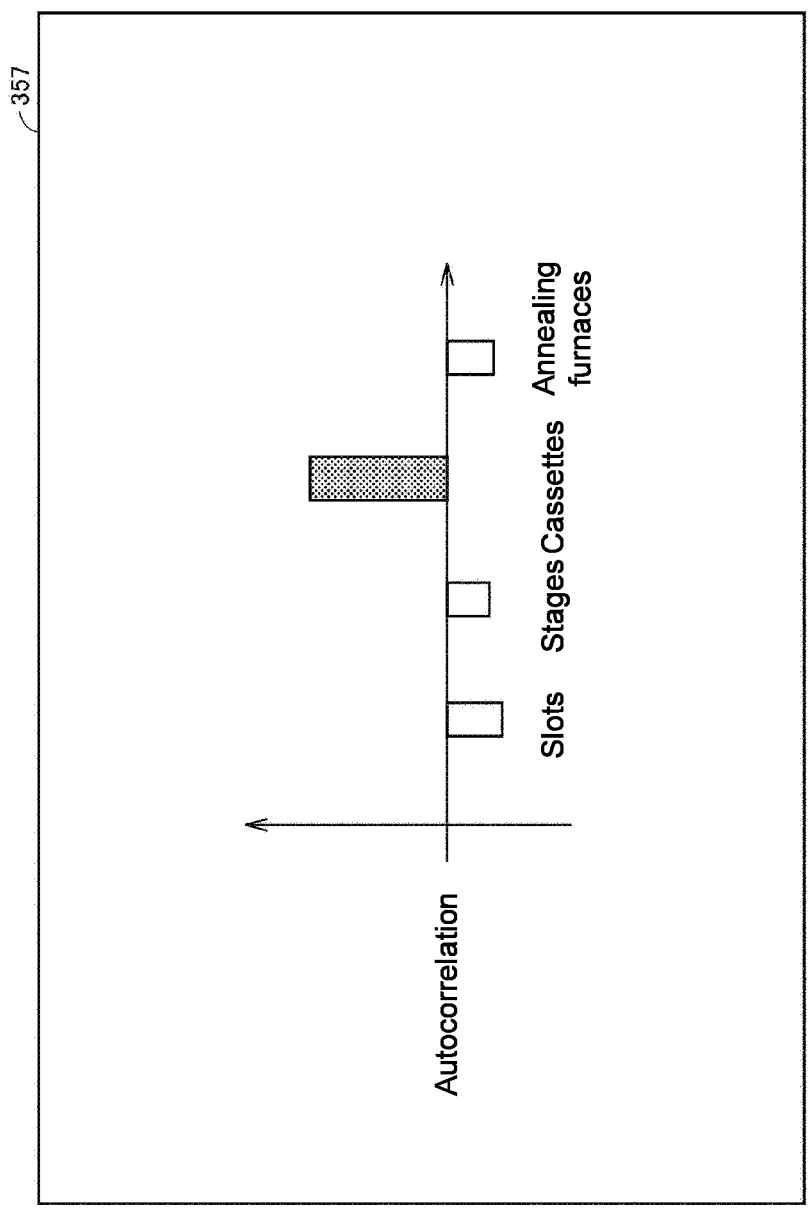
FIG. 33 is a screen example displayed based on a result of the period analysis in the case where there is no association with ID.

FIG. 33 is a screen example displayed based on a result of the period analysis (see FIG. 13) in the case where there is no association with ID. In detail, FIG. 33 is a diagram corresponding to the screen example of FIG. 20.

Referring to FIG. 33, the information processing device 3 calculates an autocorrelation for each of slots, stages, cassettes and annealing furnaces. The information processing device 3 associates the calculated autocorrelations with the slots, stages, cassettes and annealing furnaces respectively and displays the autocorrelations on the display 357.

Figure 34:
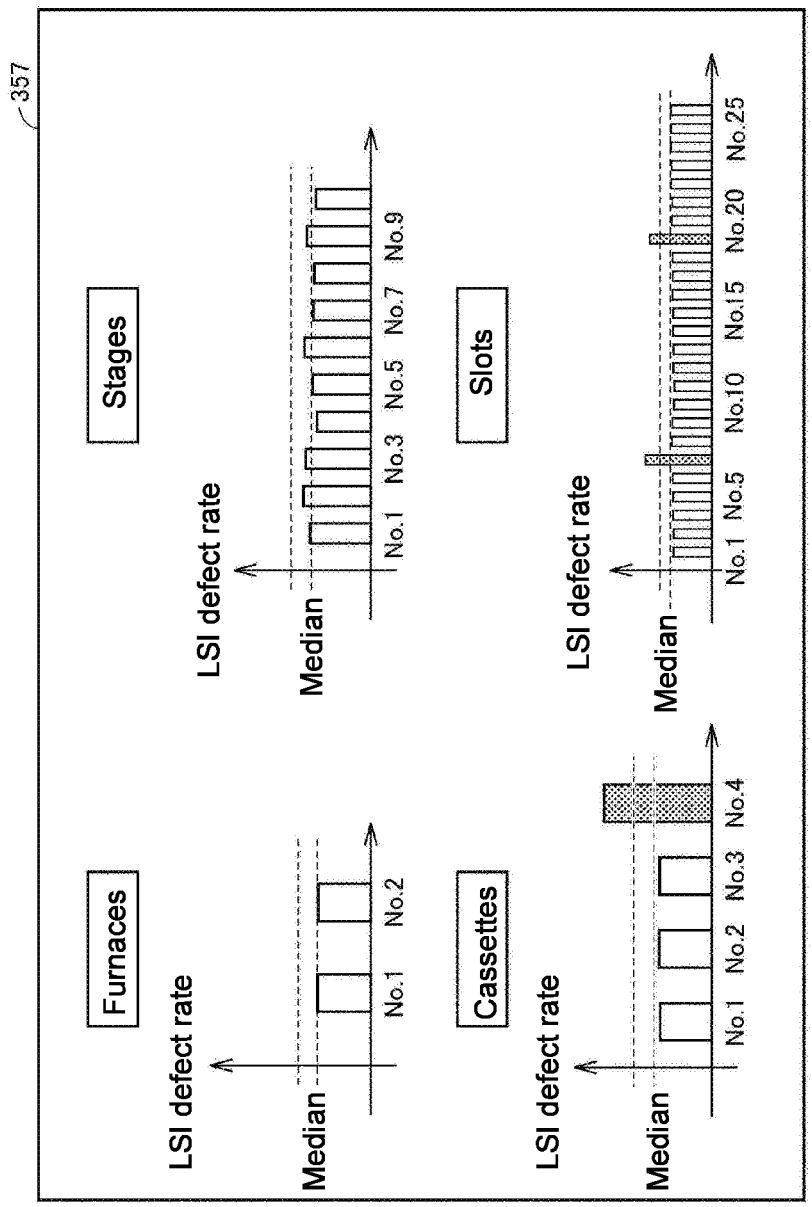
FIG. 34 is a screen example showing the production indices by factor of long-term change in the case where there is association with ID.

FIG. 34 is a screen example showing the production indices (see FIG. 14A to FIG. 14D) by factor of the long-term change in the case where there is association with ID. In detail, FIG. 34 is a diagram corresponding to the screen example of FIG. 21.

Referring to FIG. 34, the information processing device 3 causes the display 357 to display the production indices and target values with respect to each of the slots, stages, wafer cassettes and annealing furnaces. Particularly, the information processing device 3 displays a production index that exceeds the determination indicator in a display mode distinguishable from the other production indices.

In the example of FIG. 34, the information processing device 3 makes the display mode of the bar of the production index of the wafer cassette No. 4 among the four wafer cassettes and the bars of the production index of the slots No. 6 and No. 18 among the twenty five slots different from the display mode of the other bars.

Figure 35:
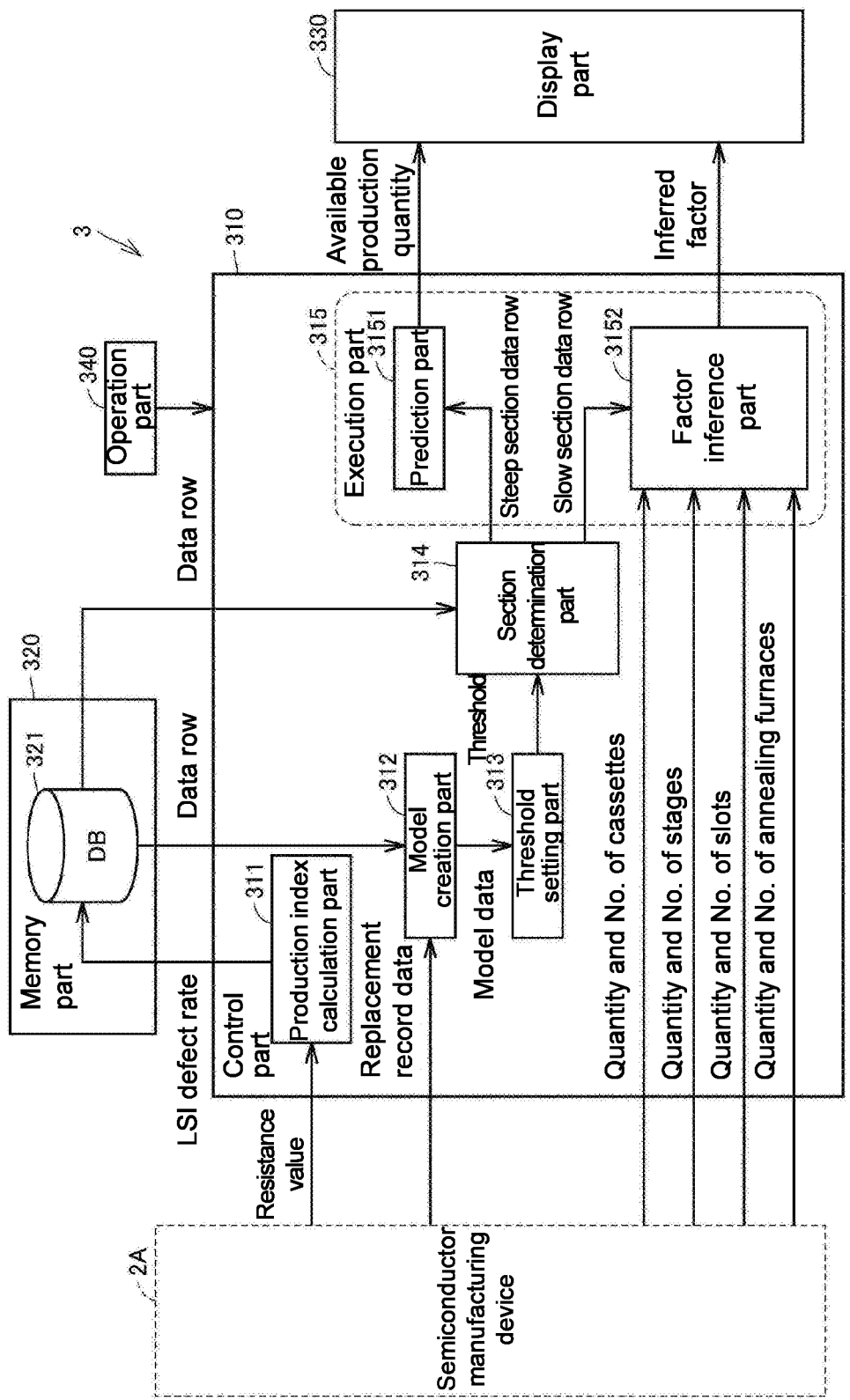
FIG. 35 is a diagram showing a functional configuration of the information processing device.

FIG. 35 is a diagram showing a functional configuration of the information processing device 3.

Referring to FIG. 35, FIG. 35 differs from the functional configuration shown in FIG. 16 in the following aspects: the production device 2 is a semiconductor manufacturing device 2A as a specific example, the measurement data input to the production index calculation part 311 is resistance value as a specific example, and the production index output from the production index calculation part 311 is LSI defect rate as a specific example.

In addition, wafer cassette-related data (such as number of cassettes, numbers as ID), stage-related data (such as number of stages, numbers as ID), slot-related data (such as number of slots, numbers as ID) and annealing furnace-related data (such as number of furnaces, numbers as ID) are input from the semiconductor manufacturing device 2A to the factor inference part 3152. This aspect is also different from FIG. 16.

Except for the above different aspects, the same processing as that explained based on FIG. 16 is executed.

(2) Second Specific Example

Figure 36:
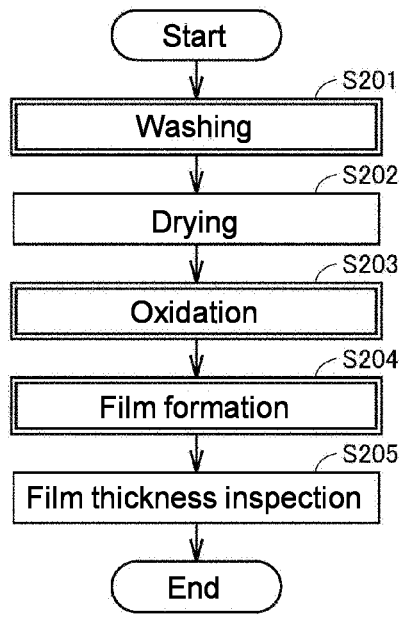
FIG. 36 is a flowchart showing an example of another flow of the preprocessing process in semiconductor manufacturing.

FIG. 36 is a flowchart showing an example of another flow of the preprocessing process in semiconductor manufacturing.

Referring to FIG. 36, in step S201, a substrate is subjected to washing. In step S202, the substrate is subjected to drying. In step S203, oxidation processing is performed on the substrate. In step S204, film formation is performed on the substrate on which the oxidation processing was performed. In step S205, a film thickness inspection is carried out. Moreover, the processing from steps S201 to S205 is conventional processing.

Figure 37:
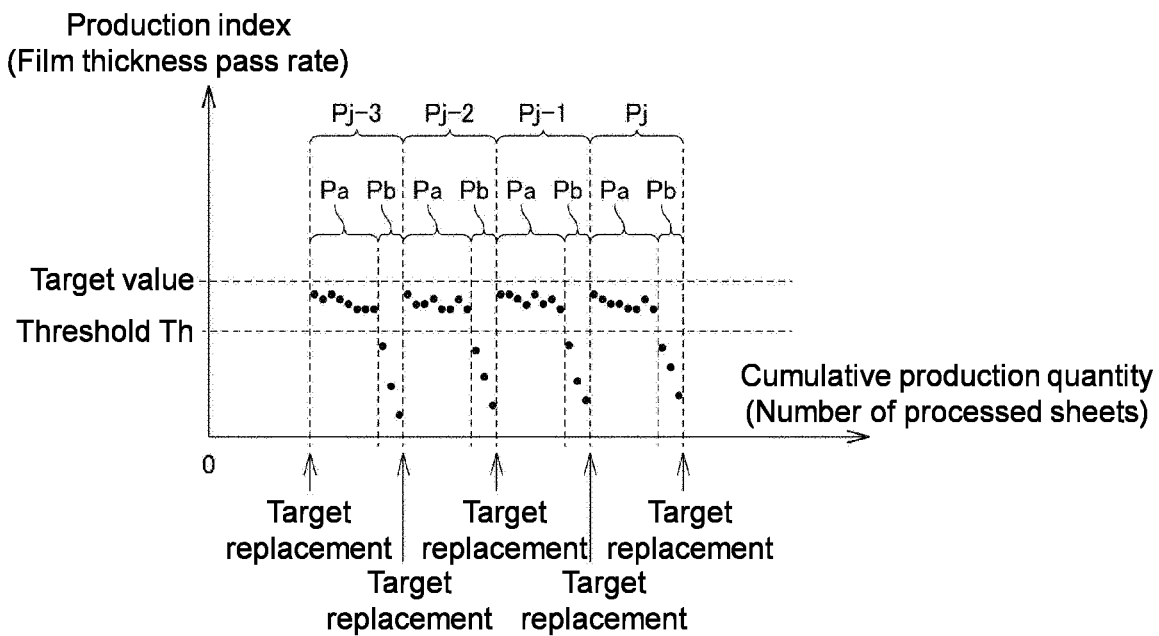
FIG. 37 is a diagram showing a time-series change in film thickness pass rate as a specific example of the production index.

FIG. 37 is a diagram showing a time-series change in film thickness pass rate as a specific example of the production index.

Referring to FIG. 37, in the steep section Pb, as the number of processed sheets increases, the film thickness pass rate decreases greatly. In addition, each time the sputtering target is replaced, the film thickness pass rate rises.

Figure 38:
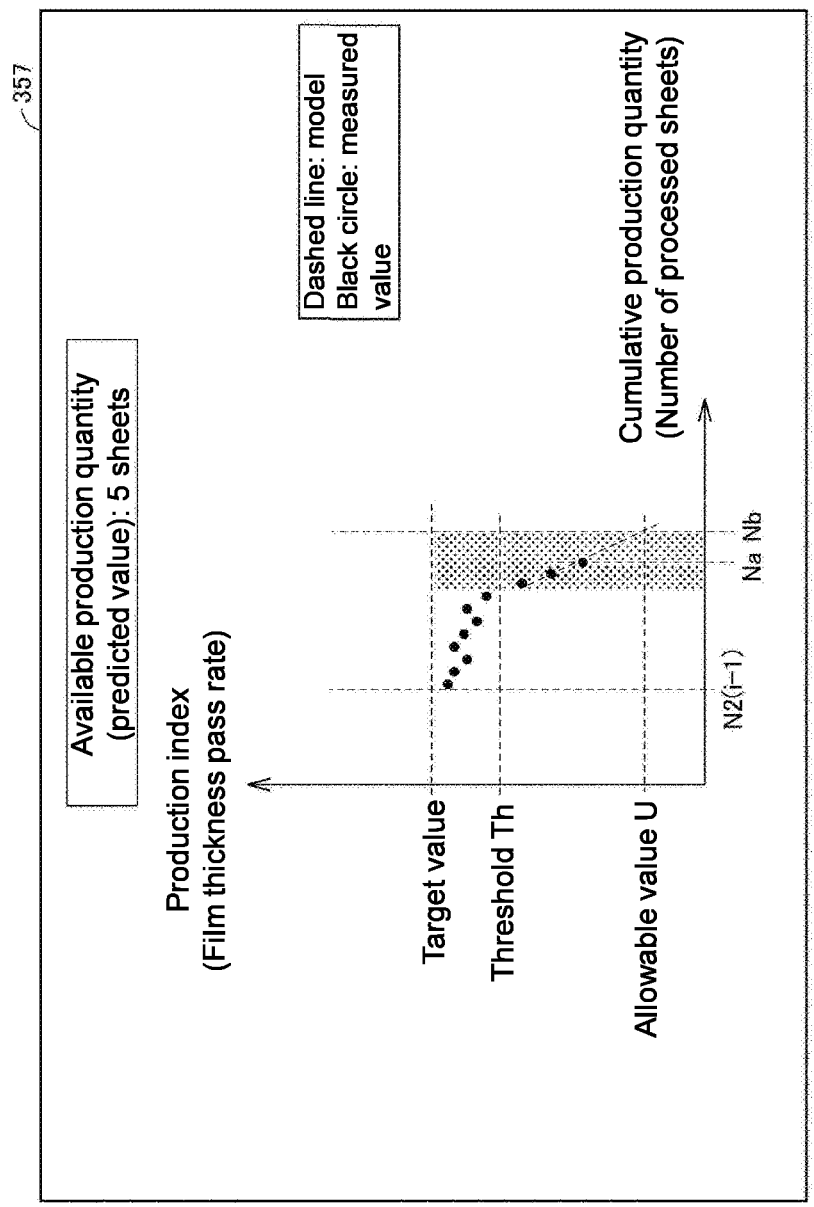
FIG. 38 is a display screen example relating to the steep section.

FIG. 38 is a display screen example relating to the steep section Pb. In detail, FIG. 38 is a diagram (showing a prediction result) corresponding to the screen example of FIG. 18.

Referring to FIG. 38, the information processing device 3 displays on the display 357 a predicted value of the available production quantity together with a straight line of a model and points.

Figure 39:
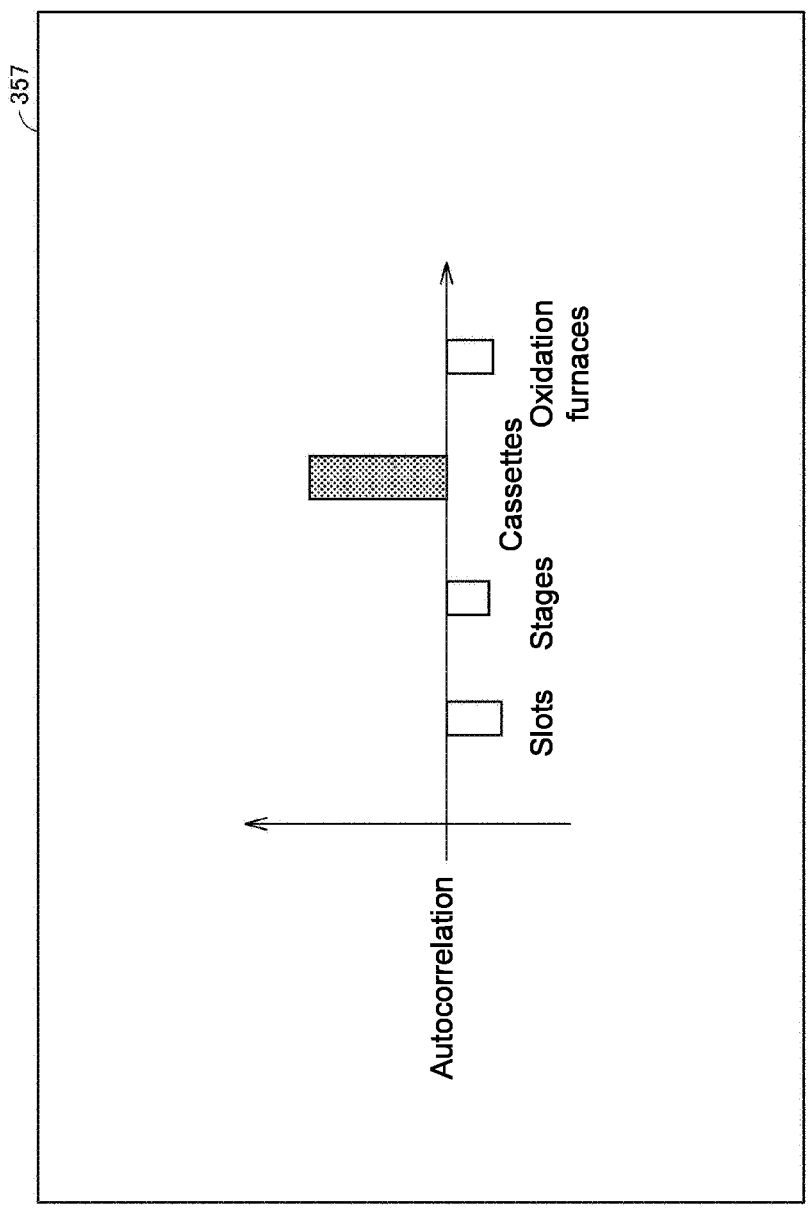
FIG. 39 is a screen example displayed based on a result of the period analysis in the case where there is no association with ID.

FIG. 39 is a screen example displayed based on a result of the period analysis (see FIG. 13) in the case where there is no association with ID. In detail, FIG. 39 is a diagram corresponding to the screen example of FIG. 20.

Referring to FIG. 39, the information processing device 3 calculates an autocorrelation for each of slots, stages, cassettes and oxidation furnaces. The information processing device 3 associates the calculated autocorrelations with the slots, stages, cassettes and oxidation furnaces respectively and displays the autocorrelations on the display 357.

Figure 40:
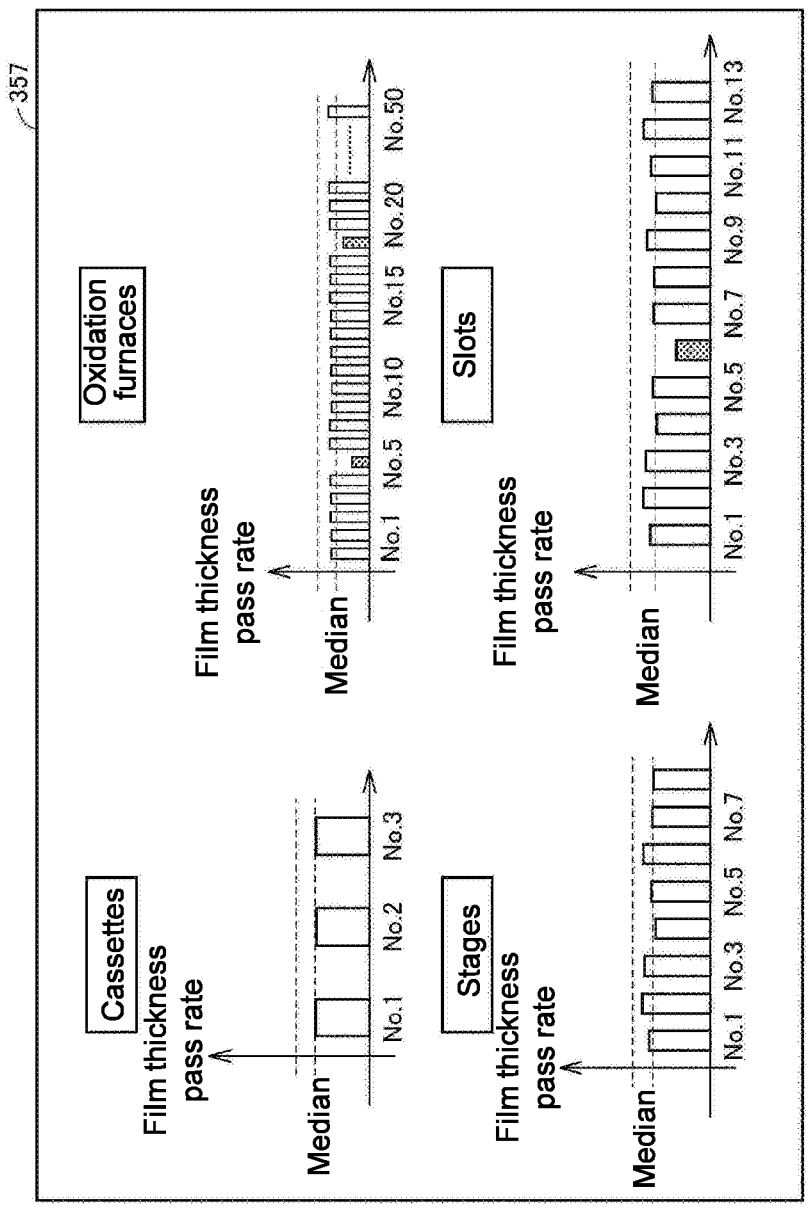
FIG. 40 is a screen example showing the production indices by factor of long-term change in the case where there is association with ID.

FIG. 40 is a screen example showing the production indices (see FIG. 14A to FIG. 14D) by factor of the long-term change in the case where there is association with ID. In detail, FIG. 40 is a diagram corresponding to the screen example of FIG. 21.

Referring to FIG. 40, the information processing device 3 causes the display 357 to display the production indices and target values with respect to each of the slots, stages, wafer cassettes and oxidation furnaces. Particularly, the information processing device 3 displays a production index that exceeds the determination indicator in a display mode distinguishable from the other production indices.

In the example of FIG. 40, the information processing device 3 makes the display mode of the bars of the production index of the oxidation furnaces No. 6 and No. 18 among the fifty oxidation furnaces and the bar of the production index of the slot No. 6 among the thirteen slots different from the display mode of the other bars.

Figure 41:
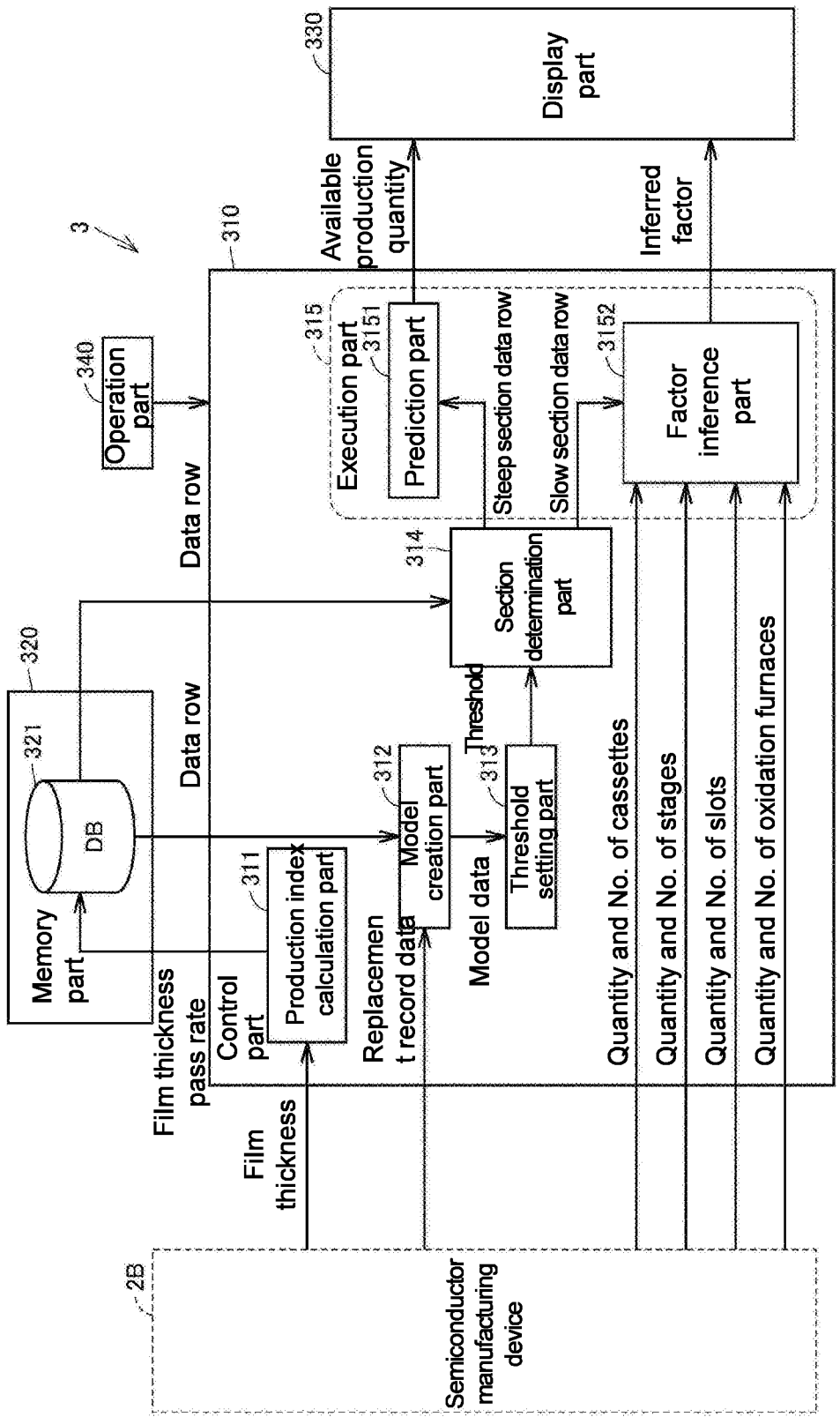
FIG. 41 is a diagram showing a functional configuration of the information processing device.

FIG. 41 is a diagram showing a functional configuration of the information processing device 3.

Referring to FIG. 41, FIG. 41 differs from the functional configuration shown in FIG. 16 in the following aspects: the production device 2 is a semiconductor manufacturing device 2B as a specific example, the measurement data input to the production index calculation part 311 is film thickness as a specific example, and the production index output from the production index calculation part 311 is film thickness pass rate as a specific example.

In addition, wafer cassette-related data (such as number of cassettes, numbers as ID), stage-related data (such as number of stages, numbers as ID), slot-related data (such as number of slots, numbers as ID) and oxidation furnace-related data (such as number of furnaces, numbers as ID) are input from the semiconductor manufacturing device 2B to the factor inference part 3152. This aspect is also different from FIG. 16.

Except for the above different aspects, the same processing as that explained based on FIG. 16 is executed.

As stated above, in the present embodiment, based on a preset threshold, it is determined whether a calculated production index belongs to either the slow section Pa or the steep section Pb contained in one replacement cycle of consumables, wherein a change in the production index is larger in the steep section Pb than in the slow section Pa. According to this, whether the calculated production index is data of the slow section Pa or data of the steep section Pb can be determined.

Furthermore, the information processing device 3 executes at least one of processing (the prediction processing of the available production quantity) using the production index determined to belong to the slow section Pa and processing (inference of the factor that causes the production index to deteriorate) using the production index determined to belong to the steep section Pb.

Since the production index changes according to a change in manufacturing conditions of a product, according to the information processing device 3, it becomes possible to execute processing according to a mode of the change in the manufacturing conditions by utilizing the production index.

[Additional Remark]

As stated above, the present embodiment contains the following disclosures.

[1] An information processing device (3) includes: a calculation part (311), calculating a production index based on quality of a product based on data acquired from a production device that produces the product using a member of at least one of a material and a component; a determination part (314), determining, based on a preset threshold, whether the production index belongs to either a first section (Pa) or a second section (Pb) contained in one maintenance cycle of the member, wherein a change in the production index is larger in the second section (Pb) than in the first section (Pa); and an execution part (315), executing at least one of first processing in which the production index determined to belong to the first section (Pa) is used and second processing in which the production index determined to belong to the second section (Pb) is used.

[2] The execution part (315) includes a prediction part (3151) predicting a remaining production quantity that can be produced by the member based on an allowable value relating to the production index as the second processing.

[3] The production device (2, 2A, 2B) produces the product using the member and a plurality of device elements each constituting the production device (2, 2A, 2B) and being different in type. A maintenance cycle of each of the device elements is longer than the maintenance cycle of the member. The execution part (315) includes an inference part (3152) inferring from among the device elements a device element that causes the production index to deteriorate as the first processing.

[4] The production device (2, 2A, 2B) has, as the device elements, a plurality of first device elements and a plurality of second device elements different from the first device elements in number and type. The inference part (3152) infers from among the first device elements and the second device elements a device element that causes the production index to deteriorate, based on periodicity of deterioration of the production index belonging to the first section (Pa) that relates to cumulative production quantity of the product.

[5] The production device (2, 2A, 2B) has a plurality of first device elements as device elements of a first type among the device elements. The product is produced using, among the first device elements, one first device element designated for each product. The production index is associated with first identification information for identifying, among the first device elements, the first device element used for production of the product. The inference part (3152) infers from among the first device elements, the first device element that was used for production of the product when the production index has deteriorated, based on the production index belonging to the first section (Pa) and the first identification information associated with the production index.

[6] The production device (2, 2A, 2B) further has a plurality of second device elements as device elements of a second type among the device elements. The product is produced using, among the second device elements, one second device element designated for each product. The production index is associated with second identification information for identifying, among the second device elements, the second device element used for production of the product. The inference part (3152) infers from among the first device elements and the second device elements a device element that causes the production index to deteriorate, based on the production index belonging to the first section (Pa) as well as the first identification information and the second identification information associated with the production index.

[7] The information processing device (3) further includes: a generation part (312), generating model data showing a relationship between the cumulative production quantity of the product and the production index; and a setting part (313), setting the threshold based on the model data.

[8] The generation part (312) generates the model data based on the production index obtained in a plurality of the maintenance cycles of the member.

[9] The first section (Pa) and the second section (Pb) are continuous.

[10] The first section (Pa) and the second section (Pb) are separated.

[11] The first section (Pa) and the second section (Pb) partially overlap.

[12] The setting part (313) sets the threshold based on the allowable value relating to the production index.

[13] The setting part (313) calculates a mathematical expression representing a curve based on the model data in a two-dimensional coordinate system using each of the cumulative production quantity and the production index as a coordinate axis, calculates a coordinate value of the coordinate axis of the production index at the time when a curvature of the curve has become the largest, and sets the calculated coordinate value as the threshold.

[14] The setting part (313) calculates a mathematical expression representing a curve based on the model data in a two-dimensional coordinate system using each of the cumulative production quantity and the production index as a coordinate axis, and sets the threshold based on an inclination of a tangent line of the curve.

[15] An information processing method includes: a step (S1) of calculating a production index based on quality of a product based on data acquired from a production device that produces the product using a member of at least one of a material and a component; a step (S13) of determining, based on a preset threshold, whether the production index belongs to either a first section (Pa) or a second section (Pb) contained in one maintenance cycle of the member, wherein a change in the production index is larger in the second section (Pb) than in the first section; and a step (S14, S16, S17) of executing at least one of first processing in which the production index determined to belong to the first section (Pa) is used and second processing in which the production index determined to belong to the second section (Pb) is used.

The embodiments disclosed herein are examples in all aspects and should not be interpreted as limitations. The scope of the disclosure is defined by claims instead of the above explanation of the embodiments, and it is intended to include all modifications within the scope of the claims and the equivalents thereof.

What is claimed is:

1. An information processing device, comprising:
    a calculation part, calculating a production index representing quality of a product based on data acquired from a production device that produces the product using a member of at least one of a material and a component;
    a generation part, generating a model curve of a model showing a relationship between cumulative production quantity of the product and the production index based on the production index obtained by the calculation part in a plurality of the maintenance cycles of the member;
    a setting part, setting a threshold based on the model curve, each maintenance cycle is classified into a first section and a second section based on the threshold;
    a determination part, determining, based on the threshold that is set based on the model the model curve, whether the production index belongs to either the first section or the second section contained in one maintenance cycle of the member, wherein a change in the production index is larger in the second section than in the first section; and
    an execution part, executing at least one of first processing in which the production index determined to belong to the first section and the model curve are used and second processing in which the production index determined belong to the second section and the model curve are used, wherein the execution part predicts a remaining production quantity that is produced by the member based on the model curve in the second section as the second processing.

2. The information processing device of claim 1, wherein the execution part comprises a prediction part predicting the remaining production quantity that is produced by the member based on an allowable value relating to the production index as the second processing.

3. The information processing device of claim 1, wherein:
    the production device produces the product using the member and device elements each constituting the production device and being different in type;
    a maintenance cycle of each of the device elements is longer than the maintenance cycle of the member;
    the execution part comprises an inference part inferring from among the device elements a device element that causes the production index to deteriorate as the first processing.

4. The information processing device of claim 2, wherein:
    the production device produces the product using the member and device elements each constituting the production device and being different in type;
    a maintenance cycle of each of the device elements is longer than the maintenance cycle of the member;
    the execution part comprises an inference part inferring from among the device elements a device element that causes the production index to deteriorate as the first processing.

5. The information processing device of claim 3, wherein:
    the production device has, as the device elements, first device elements and second device elements different from the first device elements in number and type;
    the inference part infers from among the first device elements and the second device elements a device element that causes the production index to deteriorate, based on periodicity of deterioration of the production index belonging to the first section that relates to the cumulative production quantity of the product.

6. The information processing device of claim 4, wherein:
    the production device has, as the device elements, first device elements and second device elements different from the first device elements in number and type;
    the inference part infers from among the first device elements and the second device elements a device element that causes the production index to deteriorate, based on periodicity of deterioration of the production index belonging to the first section that relates to cumulative production quantity of the product.

7. The information processing device of claim 3, wherein:
    the production device has first device elements as device elements of a first type among the device elements;
    the product is produced using, among the first device elements, one first device element designated for each product;
    the production index is associated with first identification information for identifying, among the first device elements, the first device element used for production of the product;
    the inference part infers from among the first device elements, the first device element that is used for production of the product when the production index has deteriorated, based on the production index belonging to the first section and the first identification information associated with the production index.

8. The information processing device of claim 4, wherein:
    the production device has first device elements as device elements of a first type among the device elements;

the product is produced using, among the first device elements, one first device element designated for each product;

the production index is associated with first identification information for identifying, among the first device elements, the first device element used for production of the product;

the inference part infers from among the first device elements, the first device element that is used for production of the product when the production index has deteriorated, based on the production index belonging to the first section and the first identification information associated with the production index.

9. The information processing device of claim 7, wherein:

the production device further has second device elements as device elements of a second type among the device elements;

the product is produced using, among the second device elements, one second device element designated for each product;

the production index is associated with second identification information for identifying, among the second device elements, the second device element used for production of the product;

the inference part infers from among the first device elements and the second device elements a device element that causes the production index to deteriorate, based on the production index belonging to the first section as well as the first identification information and the second identification information associated with the production index.

10. The information processing device of claim 8, wherein:

the production device further has second device elements as device elements of a second type among the device elements;

the product is produced using, among the second device elements, one second device element designated for each product;

the production index is associated with second identification information for identifying, among the second device elements, the second device element used for production of the product;

the inference part infers from among the first device elements and the second device elements a device element that causes the production index to deteriorate, based on the production index belonging to the first section as well as the first identification information and the second identification information associated with the production index.

11. The information processing device of claim 1, wherein the first section and the second section are continuous.

12. The information processing device of claim 1, wherein the first section and the second section are separated.

13. The information processing device of claim 1, wherein the first section and the second section partially overlap.

14. The information processing device of claim 5, wherein the setting part sets the threshold based on an allowable value relating to the production index.

15. The information processing device of claim 5, wherein:

the setting part
calculates a mathematical expression representing a curve based on the model data in a two-dimensional coordinate system using each of the cumulative production quantity and the production index as a coordinate axis,
calculates a coordinate value of the coordinate axis of the production index at a time when a curvature of the curve has become the largest, and
sets the calculated coordinate value as the threshold.

16. The information processing device of claim 5, wherein:

the setting part
calculates a mathematical expression representing a curve based on the model data in a two-dimensional coordinate system using each of the cumulative production quantity and the production index as a coordinate axis, and
sets the threshold based on an inclination of a tangent line of the curve.

17. An information processing method, comprising:

calculating a production index representing quality of a product based on data acquired from a production device that produces the product using a member of at least one of a material and a component;

generating a model curve of a model showing a relationship between cumulative production quantity of the product and the production index based on the production index in a plurality of the maintenance cycles of the member;

setting a threshold based on the model curve, each maintenance cycle is classified into a first section and a second section based on the threshold;

determining, based on the threshold that is set based on the model the model curve, whether the production index belongs to either the first section or the second section contained in one maintenance cycle of the member, wherein a change in the production index is larger in the second section than in the first section; and executing at least one of first processing in which the production index determined to belong to the first section and the model curve are used and second processing in which the production index determined to belong to the second section and the model curve are used, wherein the second processing comprises predicting a remaining production quantity that is produced by the member based on the model curve in the second section.

* * * * *